(12) United States Patent
Moshfeghi

(10) Patent No.: US 8,838,481 B2
(45) Date of Patent: Sep. 16, 2014

(54) METHOD AND SYSTEM FOR LOCATION BASED HANDS-FREE PAYMENT

(75) Inventor: Mehran Moshfeghi, Rancho Palos Verdes, CA (US)

(73) Assignee: Golba LLC, Rancho Palos Verdes, CA (US)

( * ) Notice: Subject to any disclaimer, the term of this patent is extended or adjusted under 35 U.S.C. 154(b) by 99 days.

(21) Appl. No.: 13/422,823

(22) Filed: Mar. 16, 2012

(65) Prior Publication Data

US 2013/0030931 A1 Jan. 31, 2013

Related U.S. Application Data

(60) Provisional application No. 61/511,963, filed on Jul. 26, 2011.

(51) Int. Cl.
*G06Q 20/32* (2012.01)

(52) U.S. Cl.
USPC ............ 705/16; 705/21; 705/18; 705/39; 705/41; 705/44; 455/456.3; 455/560; 235/380; 370/252; 340/10.31

(58) Field of Classification Search
USPC ........ 705/16, 21, 14.4, 14.58, 67; 455/456.3; 235/383, 376, 492; 340/10.31
See application file for complete search history.

(56) References Cited

U.S. PATENT DOCUMENTS

| | | | |
|---|---|---|---|
| 5,323,322 A | 6/1994 | Mueller et al. | |
| 5,796,773 A | 8/1998 | Sheynblat | |
| 5,841,971 A | 11/1998 | Longginou et al. | |
| 5,874,914 A | 2/1999 | Krasner | |
| 5,884,220 A | 3/1999 | Farmer et al. | |
| 5,999,124 A | 12/1999 | Sheynblat | |
| 6,061,632 A | 5/2000 | Dreier | |
| 6,131,067 A | 10/2000 | Girerd et al. | |
| 6,185,427 B1 | 2/2001 | Krasner et al. | |
| 6,204,808 B1 | 3/2001 | Bloebaum et al. | |
| 6,215,441 B1 | 4/2001 | Moeglein et al. | |

(Continued)

FOREIGN PATENT DOCUMENTS

| | | |
|---|---|---|
| CA | 2150757 | 5/2003 |
| JP | 2006112822 | 4/2006 |
| WO | WO 94/12892 | 6/1994 |

OTHER PUBLICATIONS

Portions of prosecution history of U.S. Appl. No. 11/940,219, Apr. 17, 2012, Moshfeghi, Mehran.

(Continued)

*Primary Examiner* — Vanel Frenel
(74) *Attorney, Agent, or Firm* — Adeli LLP

(57) ABSTRACT

Certain aspects of a method and system for location based hands-free payment may include a network that comprises a plurality of mobile devices and a plurality of point of sale devices. A first mobile device may determine its location coordinates and communicate them to a selected point of sale device. An authorization to execute a payment transaction may be triggered on the first mobile device when it is within a defined proximity of the selected point of sale device. In another embodiment of the invention, a first point of sale device may determine the location coordinates of a selected mobile device and trigger a notification based on a generated geo-fence when the selected mobile device is within a defined proximity of the first point of sale device.

50 Claims, 19 Drawing Sheets

(56) References Cited

U.S. PATENT DOCUMENTS

| | | | |
|---|---|---|---|
| 6,249,245 B1 | | 6/2001 | Watters et al. |
| 6,323,803 B1 | | 11/2001 | Jolley et al. |
| 6,323,806 B1 | | 11/2001 | Greving |
| 6,531,981 B1 | | 3/2003 | Fuller et al. |
| 6,657,586 B2 | | 12/2003 | Turner |
| 6,693,592 B2 | | 2/2004 | Dowdle et al. |
| 6,700,533 B1 | | 3/2004 | Werb et al. |
| 6,853,847 B2 | | 2/2005 | Shioda et al. |
| 6,920,330 B2 | | 7/2005 | Caronni et al. |
| 7,130,646 B2 | | 10/2006 | Wang |
| 7,433,694 B2 | | 10/2008 | Morgan et al. |
| 7,755,541 B2 | | 7/2010 | Wisherd et al. |
| 7,848,765 B2 | * | 12/2010 | Phillips et al. ............. 455/456.3 |
| 8,193,978 B2 | | 6/2012 | Moshfeghi |
| 8,294,554 B2 | | 10/2012 | Shoarinejad et al. |
| 8,570,216 B2 | | 10/2013 | Gutt et al. |
| 2005/0030160 A1 | | 2/2005 | Goren et al. |
| 2005/0088284 A1 | | 4/2005 | Zai et al. |
| 2005/0124355 A1 | | 6/2005 | Cromer et al. |
| 2005/0190789 A1 | | 9/2005 | Salkini et al. |
| 2005/0195777 A1 | | 9/2005 | Green |
| 2005/0198228 A1 | | 9/2005 | Bajwa et al. |
| 2005/0242188 A1 | | 11/2005 | Vesuna |
| 2005/0281363 A1 | | 12/2005 | Qi et al. |
| 2007/0216540 A1 | | 9/2007 | Riley et al. |
| 2007/0252758 A1 | | 11/2007 | Loomis |
| 2008/0108371 A1 | | 5/2008 | Alizadeh-Shabdiz et al. |
| 2008/0284646 A1 | | 11/2008 | Walley et al. |
| 2009/0182630 A1 | | 7/2009 | Otto et al. |
| 2009/0214039 A1 | | 8/2009 | Chen et al. |
| 2010/0161718 A1 | | 6/2010 | Soelberg et al. |
| 2011/0029400 A1 | | 2/2011 | Scipioni |
| 2011/0131104 A1 | * | 6/2011 | Rose et al. ........................ 705/17 |
| 2011/0251892 A1 | | 10/2011 | Laracey |
| 2012/0072350 A1 | | 3/2012 | Goldthwaite et al. |
| 2012/0089469 A1 | * | 4/2012 | Bonalle et al. ................... 705/16 |
| 2012/0124346 A1 | * | 5/2012 | Hardage et al. ................ 712/239 |
| 2012/0209657 A1 | * | 8/2012 | Connolly .................... 705/7.29 |
| 2012/0246079 A1 | * | 9/2012 | Wilson et al. ................... 705/67 |
| 2012/0253913 A1 | * | 10/2012 | Richard .................... 705/14.27 |
| 2012/0280859 A1 | | 11/2012 | Moshfeghi |
| 2012/0303425 A1 | * | 11/2012 | Katzin et al. ................. 705/14.4 |
| 2012/0316963 A1 | | 12/2012 | Moshfeghi |
| 2012/0323777 A1 | | 12/2012 | Liberty |
| 2012/0330763 A1 | * | 12/2012 | Gangi ............................. 705/16 |
| 2013/0029685 A1 | | 1/2013 | Moshfeghi |
| 2013/0029686 A1 | | 1/2013 | Moshfeghi |

OTHER PUBLICATIONS

Portions of prosecution history of U.S. Appl. No. 13/471,369, Jan. 27, 2014, Moshfeghi, Mehran.

Portions of prosecution history of U.S. Appl. No. 13/556,792, Mar. 5, 2014 Moshfeghi, Mehran.

Portions of prosecution history of U.S. Appl. No. 13/556,809, Mar. 5, 2014 Moshfeghi, Mehran.

Portions of prosecution history of U.S. Appl. No. 13/422,795, Feb. 24, 2014, Moshfeghi, Mehran.

Author Unknown, "Cisco Application-Oriented Networking Facilitates Intelligent Radio Frequency Identification Processing at the Edge," Month Unknown, 2005, pp. 1-9, Cisco Systems.

Author Unknown, "ConnecTerra Product Family," www.connecterra.com, Month Unknown, 2005, pp. 1-2, ConnecTerra.

Author Unknown, "Delivering an Intelligent Foundation for RFID: Maximizing Network Efficiency With Cisco RFID Solutions," Month Unknown, 2005, pp. 1-6, Cisco Systems.

Author Unknown, "Establishing the Foundation for Enterprise-Scale RFID Deployments," www.connecterra.com/products/rftagaware.php, Sep. 2004, pp. 1-2, ConnecTerra.

Author Unknown, "Four Challenges," Month Unknown, 2004, pp. 1-7, ConnecTerra.

Author Unknown, "Installation Manual R500HA Long Range RFID Reader," www.iautomate.com, Month Unknown, 2005, pp. 1-40, iAutomate.

Author Unknown, "RFTagAware™ Enterprise Server, Centralized EPC Data Management and Reporting for Enterprise-Scale RFID Deployments", www.connecterra.com, Month Unknown, 2005, 2 pages, ConnecTerra, Cambridge, MA.

Author Unknown, "The Sun Global RFID Network Vision: Connecting Businesses at the Edge of the Network," A Technical White Paper, Jul. 2004, 20 pages, Sun Microsystems, Santa Clara, CA.

Chun, Sebum, et al., "Performance Analysis of GPS Integer Ambiguity Resolution Using External Aiding Information," Journal of Global Positioning Systems, Month Unknown, 2005, vol. 4, No. 1-2, pp. 201-206.

Clark, Sean, et al., "Auto-ID Savant Specification 1.0", Sep. 2003, pp. 1-58, Auto-ID Center.

Dana, Peter H., "Global Positioning System Overview," Sep. 1994, 14 pages, www.colorado.edu/geography/gcraft/notes/gps/gps_f.html.

* cited by examiner

METHOD AND SYSTEM FOR LOCATION BASED HANDS-FREE PAYMENT

CROSS-REFERENCE TO RELATED APPLICATIONS/INCORPORATION BY REFERENCE

This patent application makes reference to, claims priority to and claims benefit from U.S. Provisional Patent Application Ser. No. 61/511,963 filed on Jul. 26, 2011.

This application also makes reference to:
U.S. application Ser. No. 13/422,795, now published as United States Patent Publication 2012-0316963, which is filed on even date herewith;
U.S. application Ser. No. 12/852,443 filed Aug. 6, 2010, now issued as U.S. Pat. No. 8,314,736;
U.S. application Ser. No. 12/833,938 filed Jul. 9, 2010, now issued as U.S. Pat. No. 8,344,949;
U.S. application Ser. No. 11/940,219 filed Nov. 14, 2007, now issued as U.S. Pat. No. 8,193,978;
U.S. application Ser. No. 12/852,446 filed Aug. 6, 2010, now published as United States Patent Publication 2011-0035284;
U.S. application Ser. No. 11/641,624 filed Dec. 18, 2006, now issued as U.S. Pat. No. 8,294,554; and
U.S. application Ser. No. 12/843,868 filed Jul. 6, 2010, now issued as U.S. Pat. No. 8,421,676.

Each of the above stated applications is hereby incorporated herein by reference in its entirety.

FIELD OF THE INVENTION

Certain embodiments of the invention relate to electronic payment transaction systems. More specifically, certain embodiments of the invention relate to a method and system for location based hands-free payment.

BACKGROUND OF THE INVENTION

The proliferation of mobile devices such as smart phones, netbooks and tablet computers has led to a growing need to obtain accurate location information of such devices. Wireless positioning may involve obtaining wireless signals and processing the signals into a location estimate. The typical information used for positioning, such as Global Positioning System (GPS) signals, may be processed to find the position of a wireless device. For example, triangulation may be used where multiple range or angle measurements from known positions are used to calculate the position of a device.

One of the sources of errors in wireless positioning is multipath propagation. Multipath propagation occurs when a signal takes different paths when propagating from a source to a destination receiver. While the signal is traveling, objects get in the way and may cause the signal to bounce in different directions before getting to the receiver. As a result, some of the signals may be delayed and travel along longer paths to the receiver. In other instances, there may be no direct line of sight because an object is completely blocking the signal and any received signals occur only due to multipath propagation. These effects may cause errors in GPS data. The computed position of the device using common techniques such as triangulation may accordingly be incorrect.

The location-aware systems may differ in terms of accuracy, coverage, cost of installation, and maintenance of the systems. The GPS systems may use satellite signals and work in outdoor environments. However, they require direct line of sight and do not work well in an indoor environment. Cell tower triangulation is another method that uses signals from cellular towers to locate a wireless user. This method may also be limited in accuracy and reliability because of the coarse number of cell towers from a particular service provider that a mobile user can communicate with, as well as multipath issues.

Systems have been developed in the past that use the strength of wireless access point beacon signals in an outdoor environment to calculate the position of a mobile user. One technique is to create a database of wireless beacons and use that information together with the amplitude of beacons signals received by a mobile device to compute the location of the mobile device. Other techniques use radio frequency (RF) wireless signal strength information and triangulation to locate objects in an indoor environment. However, these methods provide poor indoor positioning accuracy because RF signal amplitude is greatly affected by metal objects, reflective surfaces, multipath, dead-spots, noise and interference.

Other methods use time of arrival information of cellular RF signals and cell tower triangulation to determine a coarse radio-based position and then use that information to assist a GPS system to determine the GPS-based position. Cell tower triangulation may be limited in accuracy and reliability because of the coarse number of cell towers and multipath issues. Also, these methods may require the presence of a GPS signal and a GPS time reference for measuring time of arrival of cellular RF signals. This approach may not work in indoor situations where GPS signals are weak or not present. These methods also require time synchronization and prior knowledge of the position of cellular base-stations. Other methods have also used cellular tower triangulation to determine a coarse pre-fix position and use that to assist a GPS system to determine the GPS-based position.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for location based hands-free payment, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for location based hands-free payment. Exemplary aspects of the invention may comprise a network that comprises a plurality of mobile devices and a plurality of point of sale devices. A first mobile device may determine its location coordinates and communicate them to a selected point of sale device. An authorization to execute a payment transaction may be triggered on the first mobile device when it is within a defined proximity of the selected point of sale device. In another embodiment of the invention, a first point of sale device may determine the location coordinates of a selected mobile device and trigger a notification based on a generated geo-fence when the selected mobile device is within a defined proximity of the first point of sale device.

Figure 1A:
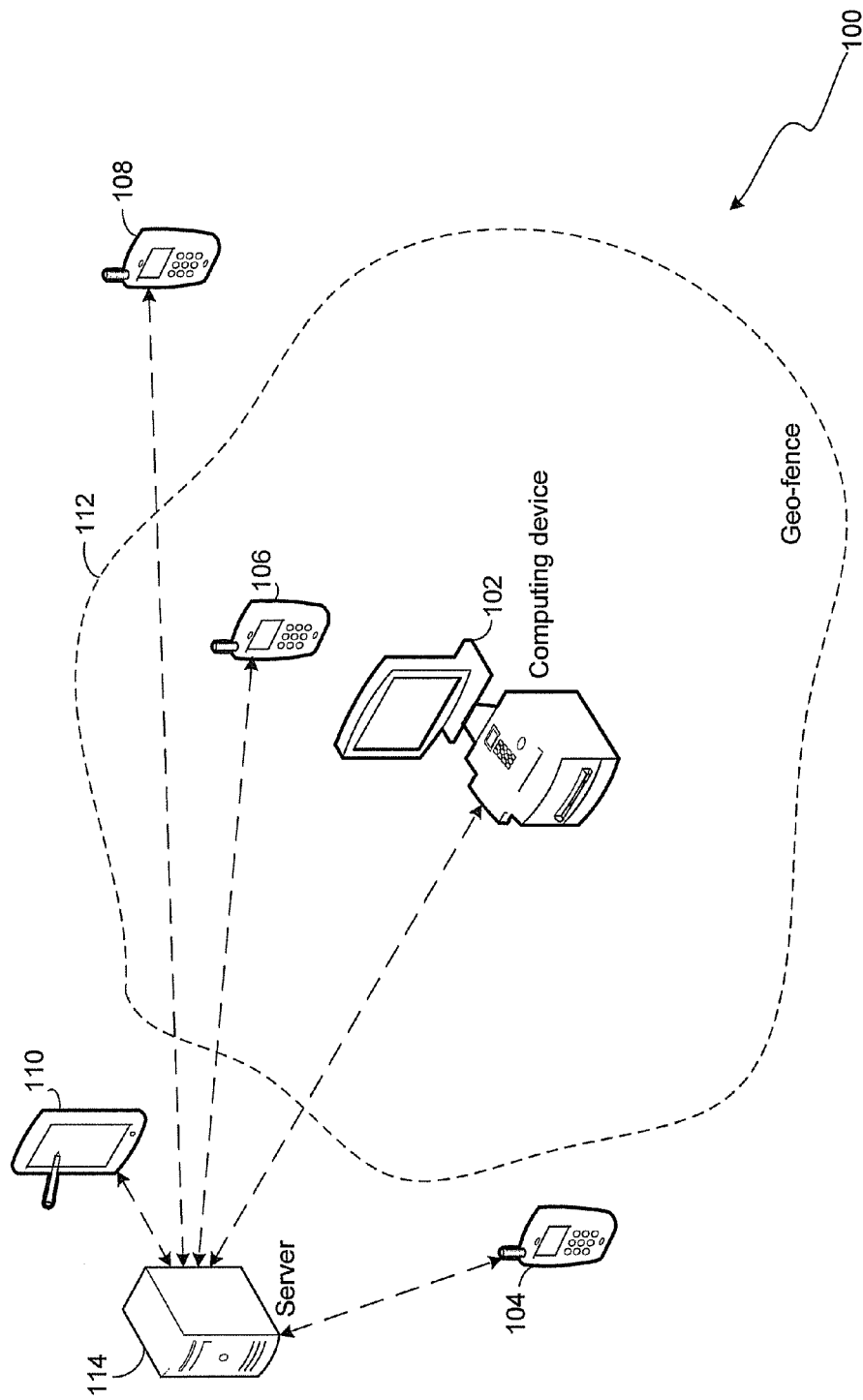
FIG. 1A is a block diagram of an exemplary network comprising one or more mobile devices and a computing device with a defined geo-fence, in accordance with an embodiment of the invention.

FIG. 1A is a block diagram of an exemplary network comprising one or more mobile devices and a computing device with a defined geo-fence, in accordance with an embodiment of the invention. Referring to FIG. 1A, there is shown a network 100. The network 100 may comprise a computing device 102, a defined geo-fence 112 around the computing device 102, a server 114, and a plurality of mobile devices 104, 106, 108, and 110. The geo-fence 112 may be a virtually fenced-off geographic location. The geo-fence 112 around the computing device 102 may be defined as any regular or irregular polygonal shape and may be dynamically modified. In accordance with an embodiment, the computing device 102 may be enabled to define the geo-fence 112 to include a circle with a defined center and a defined radius on a map, or a rectangular area, or a polygon, for example. The computing device 102 may be operable to allow a user to drag and move the geo-fence 112. Alternatively, the mobile device 106 with positioning capability may be moved around to different locations on the desired geo-fence boundary to define the geo-fence 112, for example. In one embodiment of the invention, the defined geo-fence 112 may indicate a boundary of a store within a shopping mall or a food court, for example. In another embodiment of the invention, the defined geo-fence 112 may indicate a boundary of a particular department within a store or a restaurant, or a building, or a defined outdoor area, for example. In another embodiment, the geo-fence 112 may be a three-dimensional shape that may enclose a volume. For example, a geo-fence for a business that has multiple floor levels may include multiple floors, where there are a plurality of computing devices 102 on each floor and the calculated position of the mobile device 106 may also determine which floor it is on. Some examples of three dimensional geo-fence shapes may include a rectangular prism, triangular prism, pentagonal prism, octagonal prism, polyhedron, pyramids, sphere, cube, and/or a cylinder, for example.

The computing device 102 may comprise suitable logic, circuitry, interfaces, and/or code that may be operable to perform various operations. In one embodiment of the invention, the computing device 102 may comprise a computer, monitor, cash drawer, receipt printer, customer display, a barcode scanner, a debit and/or credit card reader, and one or more application-specific programs and input/output (I/O) devices for a particular environment in which it may serve. In another embodiment of the invention, the computing device 102 may also comprise a weight scale, a global positioning system (GPS), an integrated credit card processing system, a signature capture device and/or a customer pin pad device. The computing device 102 may use touch-screen technology for ease of use and a computer may be built into its display to liberate counter space for a retailer. The computing device 102 may also use RFID readers for instances where the products use RFID tags instead of barcodes.

Each of the plurality of mobile devices 104, 106, 108, and 110 may comprise suitable logic, circuitry, interfaces, and/or code that may be operable to communicate utilizing one or more communication standards. In this regard, the plurality of mobile devices 104, 106, 108, and 110 may each be operable to transmit and/or receive data via Wireless Local Area Network (WLAN), Bluetooth, WiMax, HD Radio, Ultra-wideband (UWB), GPS, cellular, near field communication (NFC), and/or 60 GHz standards. Exemplary mobile devices may comprise laptop computers, tablet computers, mobile phones, personal digital assistants, personal media players, gaming devices, image and/or video cameras, for example. The plurality of mobile devices 104, 106, 108, and 110 may be operable to receive, process, and present multimedia content and may additionally be enabled to run a network browser or other applications for providing Internet services to a user of the mobile device. In accordance with an embodiment of the invention, the plurality of mobile devices 104, 106, 108, and 110 may comprise one or more application-specific programs for electronic payment transactions.

In operation, a user of a mobile device, for example, mobile device 106, may enter a store or a defined geo-fence around the computing device 102. The mobile device 106 may be operable to determine its location coordinates based on one or more positioning methods as detailed below with respect to, for example, FIGS. 4-15. The mobile device 106 may be operable to communicate its determined location coordinates to a server 114.

The server 114 may comprise suitable logic, circuitry, interfaces, and/or code that may be operable to receive the determined location coordinates of one or more of the plurality of mobile devices 104, 106, 108, and 110. The server 114 may be operable to determine whether any of the plurality of mobile devices 104, 106, 108, and 110 are within a defined geo-fence 112 of the computing device 102. The server 114 may be operable to communicate the determined location coordinates of one or more of the plurality of mobile devices 104, 106, 108, and 110 that are within the defined geo-fence 112 of the computing device 102.

In instances where the mobile device 106 is within the defined geo-fence 112 of the computing device 102, a notification may be triggered on the computing device 102 indicating the presence of the mobile device 106 within a defined proximity of the computing device 102. The user with the mobile device 106 may choose to purchase one or more items within the store or the defined geo-fence 112. The computing device 102 may trigger an authorization request to execute a payment transaction based on the one or more items chosen to be purchased when the mobile device 106 is within the defined geo-fence 112. The mobile device 106 may trigger an authorization response to execute the payment transaction when the mobile device 106 is within the defined geo-fence 112. In accordance with an embodiment of the invention, the user with the mobile device 106 may be able to execute the payment transaction without physically using or swiping a credit or debit card, or without physically tapping or holding the mobile device near the computing device 102.

In accordance with another embodiment, when a user of a mobile device, for example, mobile device 106, may enter or leave a geo-fence 112, one or more software downloads and upgrades may be downloaded on to the mobile device 106. For example, when mobile device 106 enters the geo-fence 112 of a mall an interactive map of the mall with deal advertisements may be downloaded on to the mobile device 106. In another embodiment, when a user of a mobile device 106 may enter or leave a geo-fence 112, the sound of the mobile device 106 may be turned on or switched off, or a volume of the mobile device 106 may be turned higher or lower. For example, when the mobile device 106 enters the geo-fence 112 of a library or a movie theater, the sound of the mobile device 106 may be turned off. In another embodiment, when a user of a mobile device 106 may enter or leave a geo-fence 112, the mobile device 106 may be powered down or enter a sleep mode or powered up or activated, for example.

In another embodiment, calendar reminders may be linked to the location of a geo-fence 112, location-based reminders may be created, a reminder may be sent with an email, SMS, vibration, voice, or facsimile (FAX) when a mobile device 106 enters or leaves the geo-fence 112. For example, when the user enters a shopping mall, a shopping list reminder may be sent to the mobile device 106. In another embodiment, the actions of a user with the mobile device 106 may be monitored and data-mined when they enter or leave a geo-fence 112. For example, when a user enters a geo-fence 112 that marks the boundary of a store, a software or web service may monitor the actions of that user in terms of the amount of time they spend at certain store areas and which products they show the most interest in. This information may then be used to present them with personalized deal advertisements on their mobile device 106, on electronic billboards and displays near them, or send them conventional mail marketing material.

In another embodiment, when a user of a mobile device 106 may enter or leave a geo-fence 112, an email, SMS, vibration, voice, and/or FAX alert may be communicated to the mobile device 106 or to another device such as the mobile device 110. In another embodiment, when a user of a mobile device 106 may enter or leave a geo-fence 112, the user interface and functionality of a location-based application or a game may be changed so that it has a different look and feel with corresponding menus. For example, a location-based R-rated game on the mobile device 106 may switch to the functionality of a less violent home edition when the mobile device 106 enters the geo-fence 112 of the mobile device 106 user's home, and may switch back to the full version once the mobile device 106 leaves the geo-fence 112. In another embodiment, a location-based application may be disabled or enabled when a user of the mobile device 106 enters or leaves the geo-fence 112. For example, a kid may not be able to play games on the mobile device 106 when the mobile device 106 is within a defined geo-fence, such as, a school, a library, and/or a home. In another embodiment, the Internet connectivity of the mobile device 106 may be location-based and may be dynamically modified when inside a geo-fence 112, for example, using Wi-Fi for Internet connectivity within a home or an office, and using a cellular data plan for Internet connectivity outside the geo-fence 112. In another embodiment, the network security settings of a mobile device 106 may be dynamically modified based on the location of the mobile device 106 within or outside the geo-fence 112. For example, for an office or home wireless network, only users inside a geo-fence 112 may be allowed to connect to the network and outside users may be denied access.

In another embodiment, a software application on the mobile device 106 may be location-based and may start running and perform certain functions when the mobile device 106 enters or leaves the geo-fence 112. For example, when a user enters a geo-fence 112 around his/her home, his/her mobile device 106 may send an alert to software applications that run on the mobile device 106 or on a different networked computer. The software applications may then turn on the lights of the house, open the garage door or the front door, turn on the TV, turn on air cooling and/or heating, for example. Similarly, when a user leaves the geo-fence 112 around his/her home, the software applications may receive an alert and turn off the lights, close all the doors, turn off the TV and other appliances, and turn off air cooling and/or heating. In another embodiment, there may be several geo-fence boundaries such as 112 and when the mobile device 106 enters or leaves each boundary, different actions may be triggered. For example, a large geo-fence may extend outside the house for opening and/or closing the garage door and front door, while a smaller geo-fence inside the house's living room may be used for turning the living room lights on/off.

In another embodiment, a first list of phone numbers may be created, and one or more phone numbers listed in the first list may be blocked as incoming voice calls, if the mobile device 106 is within the geo-fence 112. In another embodiment, a second list of phone numbers may be created, and one or more phone numbers listed in the second list may be blocked as incoming voice calls, if the mobile device 106 is outside the geo-fence 112. In another embodiment, a third list of Internet web addresses may be created, and one or more web addresses listed in the third list may be blocked from being accessed, if the mobile device 106 is within the geo-fence 112. In another embodiment, a fourth list of Internet web addresses may be created, and one or more web addresses listed in the fourth list may be blocked from being accessed, if the mobile device 106 is outside the geo-fence 112.

In another embodiment, a user with the mobile device 106 may automatically check-in at a social networking web site, for example, Foursquare or Gowalla and receive award points when the user enters the geo-fence 112 of a particular location. This removes the need for the user to manually check-in to get award points. In another embodiment, a user with a mobile device 106 has to enter the geo-fence 112 associated with a business, for example, a restaurant, a hotel, a bar, or a night club in order to be able to write a review on a rating web site, for example, Yelp or Tripadvisor. The review may be written while the user is inside the geo-fence 112 or at a later time when the user is outside the geo-fence 112.

In another embodiment, users of a ratings web site may filter the rating reviews of a business based on a function of the interaction of the reviewer with the geo-fence 112 associated with the business. The function may vary depending upon factors, such as, has the reviewer ever been inside the geo-fence 112, how many times has the reviewer been inside the geo-fence 112, what times and dates have the reviewer been inside the geo-fence 112. The users of the ratings web site may, for example, filter out or assign a smaller weight to reviews from people who have not been inside the geo-fence 112 of a particular business, but have nonetheless written a review. This allows users of the rating web site to ignore or assign a smaller weight to the reviews from people who have written biased reviews of businesses such as hotels, brick and mortar stores, restaurants, and night clubs without visiting them. Similarly, users of the rating web site may filter out or assign a smaller weight to reviews from people who have spent excessive time inside the geo-fence 112 of a business. This may allow users of the rating web site to filter out or assign a smaller weight to the reviews from people who work for a business and write biased reviews on that business. In another embodiment, users of a ratings web site may filter the rating reviews of a business based on a function of the interaction of the reviewer with the geo-fence 112 associated with the business as well as the geo-fence 112 of related businesses. The geo-fence 112 may not only describe the geography it encloses, but may also have other properties, such as, a business category, for example, a restaurant, a hotel, a bar or a night club. For example, a person who has been inside the geo-fence 112 of many restaurants over a period of time as well as the geo-fence 112 of restaurant X can be considered an experienced reviewer of restaurants and his/her review of restaurant X may be given a higher weighting. In another embodiment, people posting reviews on a rating web site have stored their information with the web site. The information may include home address, age and/or marital status. Users of the ratings web site may then filter the reviews of others based on complex queries such as interaction of the reviewer with one or more geo-fences 112, their home and/or work address, their demographics, and their current tracked location. For example, users of the rating web site can query the web site to "Show the top five highest rated hotels in Cancun from people who have been inside the geo-fences of the hotels in the past", or "Show the top five highest rated hotels in Cancun from people who have been inside the geo-fences of the hotels in the past and have been inside the geo-fences of at least 10 other hotels in Cancun in the past", or "Show the top five highest rated hotels in Cancun from people who live in California and who have been inside the geo-fences of the hotels in the past", or "Show the top five highest rated hotels in Cancun from people with kids who live in California and who have been inside the geo-fences of the hotels in the past", or "Show the top five highest rated hotels in Cancun from people with kids whose present tracked location is California and who have been inside the geo-fences of the hotels in the past". These query methods can be supplied to users with a simple user interface that has for example multiple checkboxes and fields that allow combining simple queries into more complex queries. It may be possible for a person posting a review on the ratings web site to login and post their review with a different computing device than their mobile position tracking device. People posting reviews of businesses on the ratings web site may disable position tracking or not provide it. However, as a result, their reviews may be assigned less weight by the ratings web site or by users of the ratings web site since there is no record of the reviewers being in the geographical proximity of the places they are reviewing.

In another embodiment, a user with the mobile device 106 who enters a geo-fence 112 may receive notifications to inform him/her which of his/her friends are inside the geo-fence 112 area. The notification may be via an email, SMS, vibration, voice, map on the display of the mobile device 106, and/or a FAX alert. Similarly, when a user with the mobile device 106 leaves a geo-fence area 112 he/she may automatically check out and/or send notifications to his/her friends to notify them that he/she is no longer inside the geo-fence 112. In another embodiment, a moving object may be carrying a first position tracking device within the mobile device 106 and when the mobile device 106 enters or leaves a geo-fence 112, a notification may be sent to a second mobile device 110. The notification may be via an email, a SMS, vibration, voice, FAX alert, and/or map on the display of the mobile device 110 with the positions of the mobile device 106, the geo-fence 112, and the mobile device 110. For example, the mobile device 106 may be attached to a child that is being tracked by a parent with the mobile device 110, or the mobile device 106 may be attached to a company vehicle that is being tracked by a supervisor, or the mobile device 106 may be attached to a livestock that is being tracked by a farmer.

Figure 1B:
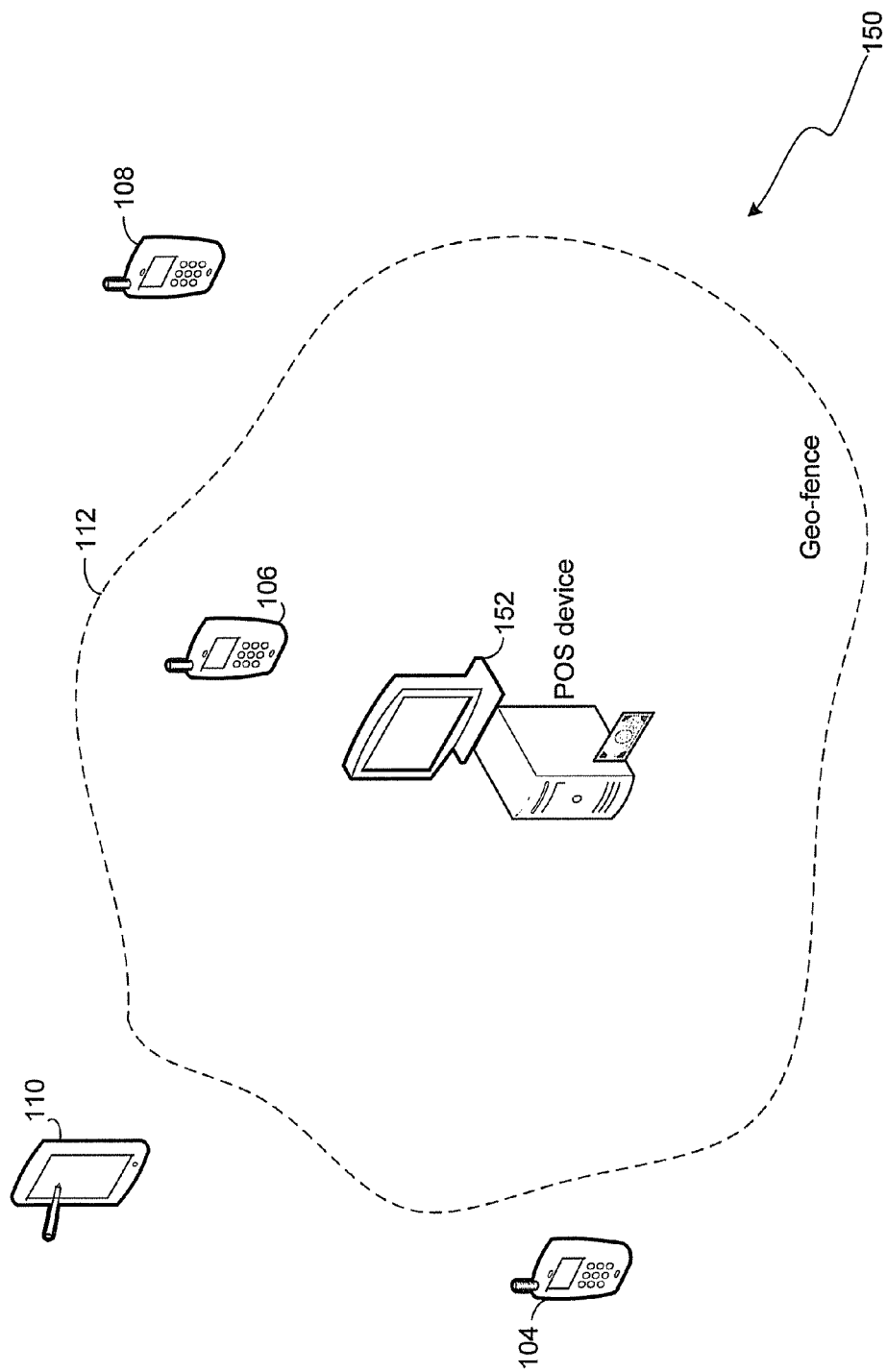
FIG. 1B is a block diagram of an exemplary network comprising one or more mobile devices and a point of sale device, in accordance with an embodiment of the invention.

In accordance with an embodiment, the computing device 102 may be a point of sale (POS) device as illustrated in FIG. 1B. Notwithstanding, the invention may not be so limited, and the computing device 102 may be any device with computer processing capability without limiting the scope of the invention.

FIG. 1B is a block diagram of an exemplary network comprising one or more mobile devices and a point of sale device, in accordance with an embodiment of the invention. Referring to FIG. 1B, there is shown a network 150. The network 150 may comprise a POS device 152, a defined geo-fence 112 around the POS device 152, and a plurality of mobile devices 104, 106, 108, and 110. The geo-fence 112 may be a virtually fenced-off geographic location. The geo-fence 112 around the POS device 152 may be defined as any regular or irregular polygonal shape and may be dynamically modified. In accordance with an embodiment, the POS device 152 may be enabled to define the geo-fence 112 to include a circle with a defined center and a defined radius on a map, or a rectangular area, or a polygon, for example. The POS device 152 may be operable to allow a user to drag and move the geo-fence 112. Alternatively, the mobile device 106 with positioning capability may be moved around to different locations on the desired geo-fence boundary to define the geo-fence 112, for example. In one embodiment of the invention, the defined geo-fence 112 may indicate a boundary of a store within a shopping mall or a food court, for example. In another embodiment of the invention, the defined geo-fence 112 may indicate a boundary of a particular department within a store or a restaurant, or a building, or a defined outdoor area, for example. In another embodiment, the geo-fence 112 may be a three-dimensional shape that may enclose a volume. For example, a geo-fence for a business that has multiple floor levels may include multiple floors, where there are a plurality of POS devices 152 on each floor and the calculated position of the mobile device 106 may also determine which floor it is on. Some examples of three dimensional geo-fence shapes may include a rectangular prism, triangular prism, pentagonal prism, octagonal prism, polyhedron, pyramids, sphere, cube, and/or a cylinder, for example.

The POS device 152 may comprise suitable logic, circuitry, interfaces, and/or code that may be operable to record and track customer orders, process credit and debit cards, process electronic commerce payment transactions, connect to other systems in a network, purchasing, receiving and transferring of products to and from other locations, and/or manage inventory. In one embodiment of the invention, the POS device 152 may comprise a computer, monitor, cash drawer, receipt printer, customer display, a barcode scanner, a debit and/or credit card reader, and one or more application-specific programs and input/output (I/O) devices for a particular environment in which it may serve. In another embodiment of the invention, the POS device 152 may also comprise a weight scale, a global positioning system (GPS), an integrated credit card processing system, a signature capture device and/or a customer pin pad device. The POS device 152 may use touchscreen technology for ease of use and a computer may be built into its display to liberate counter space for a retailer. The POS device 152 may also use RFID readers for instances where the products use RFID tags instead of barcodes.

The POS device 152 may be operable to handle a myriad of customer based functions, such as, sales, returns, exchanges, layaways, gift cards, gift registries, customer loyalty programs, quantity discounts, pre-planned promotional sales, manufacturer coupon validation, foreign currency handling and multiple payment types. A POS device 152 for a restaurant, for example, may comprise all menu items stored in a database that may be queried for information in a plurality of ways. The POS device 152 may be utilized in various industries that may have a point of sale, such as, a service desk, including restaurants, lodging, entertainment, and museums. The POS device 152 may be web-enabled, and may be operable to remotely process transactions and track inventory across geographically-dispersed locations.

Each of the plurality of mobile devices 104, 106, 108, and 110 may comprise suitable logic, circuitry, interfaces, and/or code that may be operable to communicate utilizing one or more communication standards. In this regard, the plurality of mobile devices 104, 106, 108, and 110 may each be operable to transmit and/or receive data via Wireless Local Area Network (WLAN), Bluetooth, WiMax, HD Radio, Ultra-wideband (UWB), GPS, cellular, near field communication (NFC), and/or 60 GHz standards. Exemplary mobile devices may comprise laptop computers, tablet computers, mobile phones, personal digital assistants, personal media players, gaming devices, image and/or video cameras, for example. The plurality of mobile devices 104, 106, 108, and 110 may be operable to receive, process, and present multimedia content and may additionally be enabled run a network browser or other applications for providing Internet services to a user of the mobile device. In accordance with an embodiment of the invention, the plurality of mobile devices 104, 106, 108, and 110 may comprise one or more application-specific programs for electronic payment transactions.

In operation, a user of a mobile device, for example, mobile device 106, may enter a store or a defined geo-fence around the POS device 152. The POS device 152 may be operable to determine the location coordinates of the mobile device 106 based on one or more positioning methods as detailed below with respect to, for example, FIGS. 4-15. In instances where the mobile device 106 is within the defined geo-fence 112 of the POS device 152, a notification may be triggered on the POS device 152 indicating the presence of the mobile device 106 within a defined proximity of the POS device 152. The user with the mobile device 106 may choose to purchase one or more items within the store or the defined geo-fence 112. The POS device 152 may trigger an authorization request to execute a payment transaction based on the one or more items chosen to be purchased when the mobile device 106 is within the defined geo-fence 112. The mobile device 106 may trigger an authorization response to execute the payment transaction when the mobile device 106 is within the defined geo-fence 112. In accordance with an embodiment of the invention, the user with the mobile device 106 may be able to execute the payment transaction without physically using or swiping a credit or debit card, or without physically tapping or holding the mobile device near the POS device 152.

Figure 2:
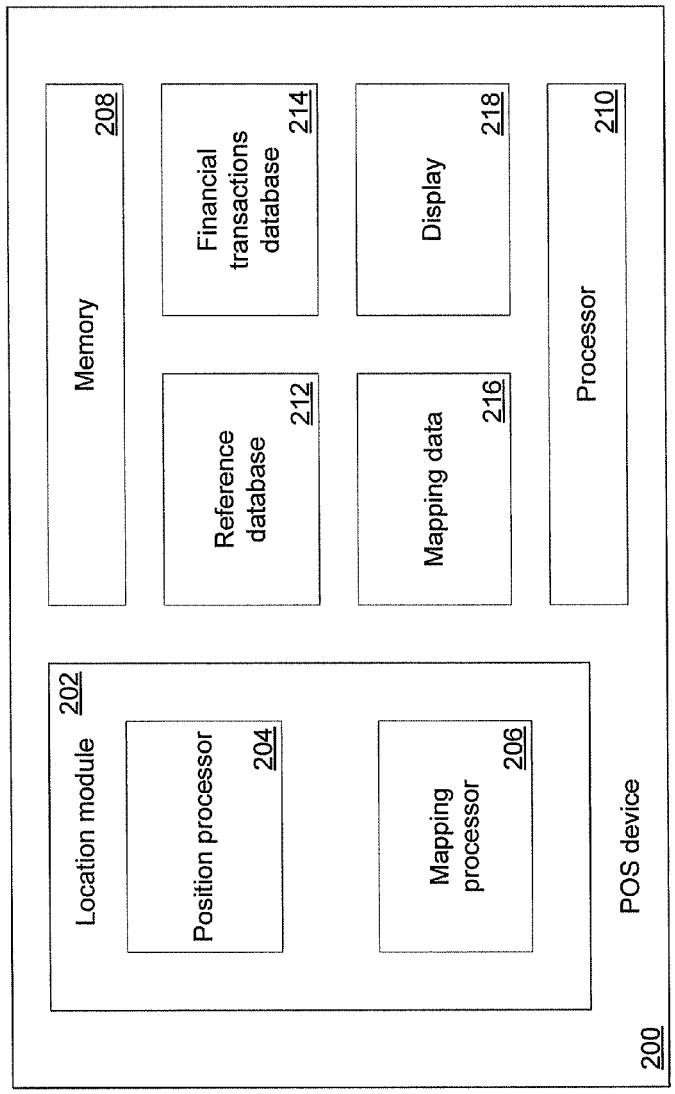
FIG. 2 is a block diagram of an exemplary POS device, in accordance with an embodiment of the invention.

FIG. 2 is a block diagram of an exemplary POS device, in accordance with an embodiment of the invention. Referring to FIG. 2, there is shown a POS device 200. The POS device 200 may be a networked server, for example. The POS device 200 may comprise a location module 202, a processor 210, a memory 208, a reference database 212, a financial transactions database 214, mapping data 216, and a display 218.

The location module 202 may be operable to determine the location coordinates of the POS device 200 and/or one or more mobile devices, for example, mobile device 106. The location coordinates may be determined in Cartesian coordinates, latitude and longitude coordinates and altitude for a 3D position, and polar coordinates. The location module 202 may comprise a position processor 204 and a mapping processor 206.

The location module 202 may receive measured position parameters and positions of the systems where the position parameters were measured. The location module 202 may be operable to determine the position of the mobile device 106 based on one or more positioning methods as detailed below with respect to FIGS. 4-15. The location module 202 may comprise a position processor 204 that may be operable to determine the raw location parameters that provide the position of a RFID tag in the mobile device 106, for example. For example, the raw location parameters may represent the position of the RFID tag as longitude, latitude, altitude, in Cartesian coordinates, polar coordinates, such as, distances and angles, or as vectors, for example.

The location module 202 may comprise a mapping processor 206 that may be operable to receive the raw location parameters and mapping data, and transform the raw location parameters into mapping position information. The mapping data 216 may be used to transform the RFID tag's position from Cartesian coordinates or vector representations, for example, into mapped position information, such as, shelf locations, aisles, rooms, warehouses, hallways, or streets. The mapping software components may receive mapping data that maps raw position parameters into mapped position information. The mapping data 216 may further comprise images or maps that may be displayed to a user with the RFID tag superimposed on the image. The mapping data 216 may include information for translating raw location parameters into mapped position information, images, or information for translating between RFID tag IDs and the names of items to which the RFID tags are attached. In other embodiments of the invention, some or all of this information may be received from an external source system such as the POS device 200, for example. In other embodiments of the invention, mapping data may be stored on the RFID tag itself. The mapping data 216 may further include navigation information for providing directions to the user based on the user's current location and the location of a RFID tag.

The processor 210 may comprise suitable logic, circuitry, interfaces, and/or code that may be operable to manage the operations of the POS device 200. For example, the processor 210 may instruct one of a plurality of RFID readers to generate RF signals to a mobile device and receive backscattered signals from the mobile device to determine the location of the mobile device. The memory 208 may be operable to store the location coordinates of the plurality of RFID readers, for example.

The reference database 212 may comprise suitable logic, circuitry, interfaces, and/or code that may be operable to store the received channel parameters. The financial transactions database 214 may comprise suitable logic, circuitry, interfaces, and/or code that may be operable to store a user's past purchases with the store or restaurant, credit and/or debit card authorizations associated with the user, returns, exchanges, layaways, gift cards, gift registries, and/or customer loyalty programs associated with the user. The POS device 200 may trigger an authorization to execute a payment transaction for the one or more items to be purchased when the mobile device 106 is within the defined geo-fence 112.

The display 218 may indicate a map of a store, a shopping mall, or a restaurant, for example. The map may indicate a plurality of POS devices, and one or more corresponding defined geo-fences around the POS devices respectively, which may represent individual stores in a shopping mall or restaurants in a food court, for example. The display 218 may indicate a location of one or more mobile devices within the defined geo-fences. The display 218 may also indicate a speed of movement and a direction of movement of the plurality of mobile devices at the selected plurality of point of sale devices.

Notwithstanding, the invention may not be so limited, and the signaling and position calculations of the mobile devices 104-110 may be controlled by a remote networked server 114, for example. The plurality of the mobile devices 104-110 may be operable to communicate their determined location coordinates to a remote networked server 114, for example, a server at the social networking site Foursquare. The remote networked server 114 may then provide the position and map results to the POS device 152 without limiting the scope of the invention.

Figure 3A:
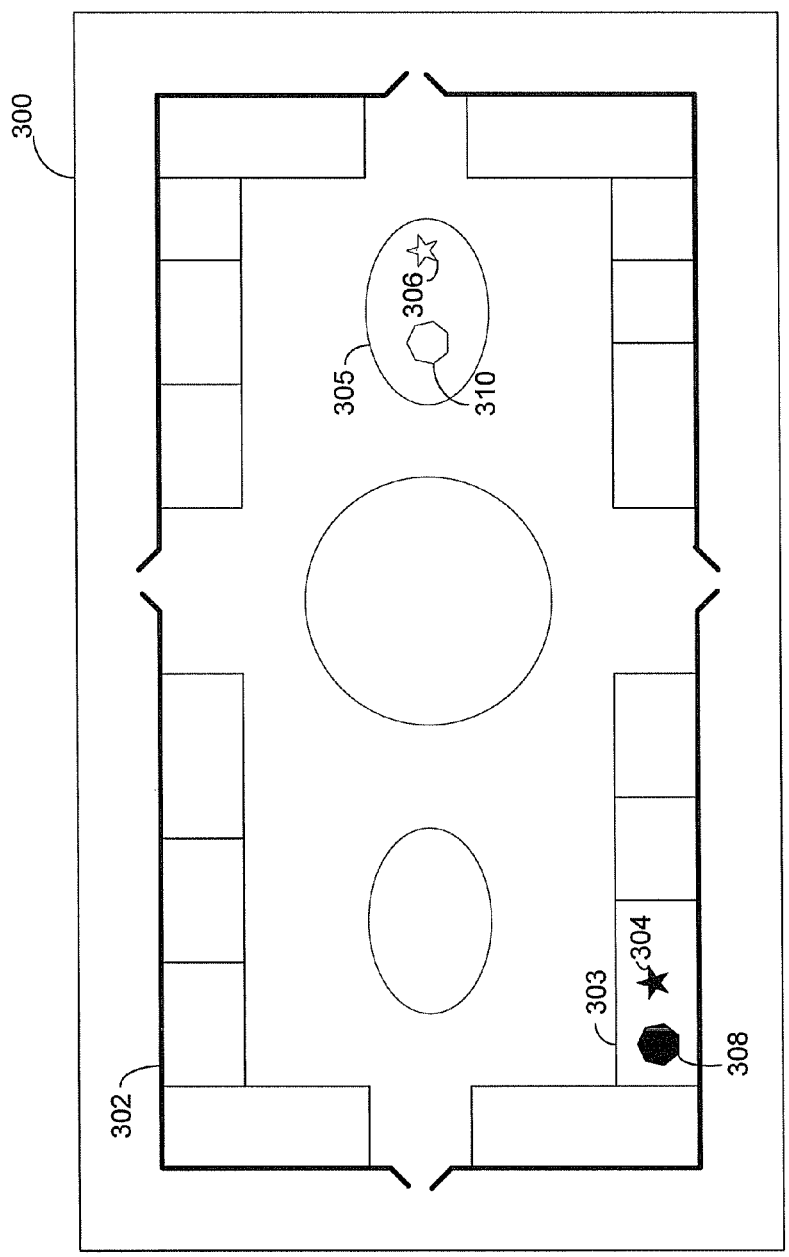
FIG. 3A is a diagram of an exemplary display showing a schematic map indicating defined geo-fences and a location of one or more mobile devices within the defined geo-fences, in accordance with an embodiment of the invention.

FIG. 3A is a diagram of an exemplary display showing a schematic map indicating defined geo-fences and a location of one or more mobile devices within the defined geo-fences, in accordance with an embodiment of the invention. Referring to FIG. 3A, there is shown a display 300. The display 300 may be a display of the POS device 152 or may be a display of the mobile device 106, for example.

The display 300 may indicate a map 302 of a store, a shopping mall, or a restaurant, for example. The map 302 may indicate a plurality of POS devices 308 and 310, and one or more corresponding defined geo-fences 303 and 305 around the POS devices 308 and 310 respectively, which may represent individual stores in a shopping mall or restaurants in a food court, for example. The display 300 may indicate a location of one or more mobile devices 304 and 306 within the defined geo-fences 303 and 305 respectively. The display 300 may also indicate a speed of movement and a direction of movement of the plurality of mobile devices 304 and 306 at the selected plurality of point of sale devices 308 and 310. Accordingly, staff may be assigned to designated sections of a store or stores in a mall based on the indicated speed of movement and the direction of movement of the plurality of mobile devices 304 and 306 at the selected plurality of point of sale devices 308 and 310. The staff at the POS devices 308 and 310 may also correlate the speed and/or direction and identifying information of users of mobile devices 304 and/or 306 on the map 302 with their own visual sight of the people in their vicinity and use that information when they interact with the users of the mobile devices. The store advertising displays may also use the speed and direction information, where displays that are facing a user with a mobile device and are about to come into his/her range of view are activated and present customized information and advertisement to the user.

A user of the mobile device 304 may enter a store or the defined geo-fence 303 around the POS device 308. The mobile device 304 may be operable to determine its location coordinates based on one or more positioning methods as detailed below with respect to FIGS. 4-15, and communicate its location coordinates to the POS device 152. In another embodiment of the invention, the POS device 308 may be operable to determine the location coordinates of the mobile device 304 based on one or more positioning methods as detailed below with respect to FIGS. 4-15. In instances where the mobile device 304 is within the defined geo-fence 303 of the POS device 308, a notification may be triggered on the mobile device 304 indicating its presence within a defined proximity of the POS device 308. In another embodiment of the invention, in instances where the mobile device 304 is within the defined geo-fence 303 of the POS device 308, a notification may be triggered on the POS device 308 indicating the presence of the mobile device 304 within a defined proximity of the POS device 308.

The user with the mobile device 304 may choose to purchase one or more items within the defined geo-fence 303. The POS device 308 may be operable to store the user's past purchases with the store or restaurant, credit and/or debit card authorizations associated with the user, returns, exchanges, layaways, gift cards, gift registries, and/or customer loyalty programs associated with the user. The POS device 308 may trigger an authorization to execute a payment transaction for the one or more items to be purchased when the mobile device 304 is within the defined geo-fence 303. The mobile device 304 may preset its settings to trigger an authorization response to execute the payment transaction when the mobile device 304 is within the defined geo-fence 303.

In accordance with another embodiment of the invention, the POS device 308 may be operable to determine the location coordinates of the mobile device 304 within a 10 meter radius, for example. Accordingly, the POS device 308 may enable triggering an authorization to execute a payment transaction only when the mobile device 304 is within a particular defined geo-fence 303. In other words, the POS device 308 may not enable triggering an authorization to execute a payment transaction when the mobile device 304 is outside the defined geo-fence 303 or within a neighboring store or defined geo-fence 305, for example. In another embodiment of the invention, the mobile device 304 may preset its settings to selectively trigger an authorization response to execute the payment transaction when the mobile device 304 is within a defined geo-fence 303, and may choose not to trigger an authorization response to execute the payment transaction when the mobile device 304 is outside the defined geo-fence 303 or within a neighboring store or defined geo-fence 305.

In another embodiment of the invention, the mobile device 304 may also choose to purchase one or more items from a neighboring store or defined geo-fence 305. Accordingly, the POS device 310 in the neighboring geo-fence 305 may be operable to store the user's past purchases with the store, credit and/or debit card authorizations associated with the user, returns, exchanges, layaways, gift cards, gift registries, and/or customer loyalty programs associated with the user. The mobile device 304 may preset its settings to selectively trigger an authorization response to execute the payment transaction when the mobile device 304 is within the defined geo-fence 305

In accordance with another embodiment of the invention, a POS device 308 may be operable to define multiple geo-fences and each geo-fence may cover different areas for different applications. For example, the geo-fence for a location-based hands-free payment may be inside the store or geo-fence 303 and a small distance or radius from the POS device 308, while the geo-fence for sending deal advertisements may cover a larger distance and even include locations outside the store, for example, the stores and areas disclosed in map 302. Notwithstanding, a store may have multiple POS devices. A deal advertisement may be sent from the store's server rather than a particular POS device within the store, for example.

In accordance with another embodiment of the invention, the users of mobile devices may use their mobile device to browse products of nearby merchants, make a reservation and/or place an order, and then when they are near a merchant's POS device 308, may complete the transaction. The geo-fence for placing an order may be different, for example, the stores and areas disclosed in map 302 compared to the geo-fence 303 for proximity to the POS device 308 and completion of the transaction.

Figure 3B:
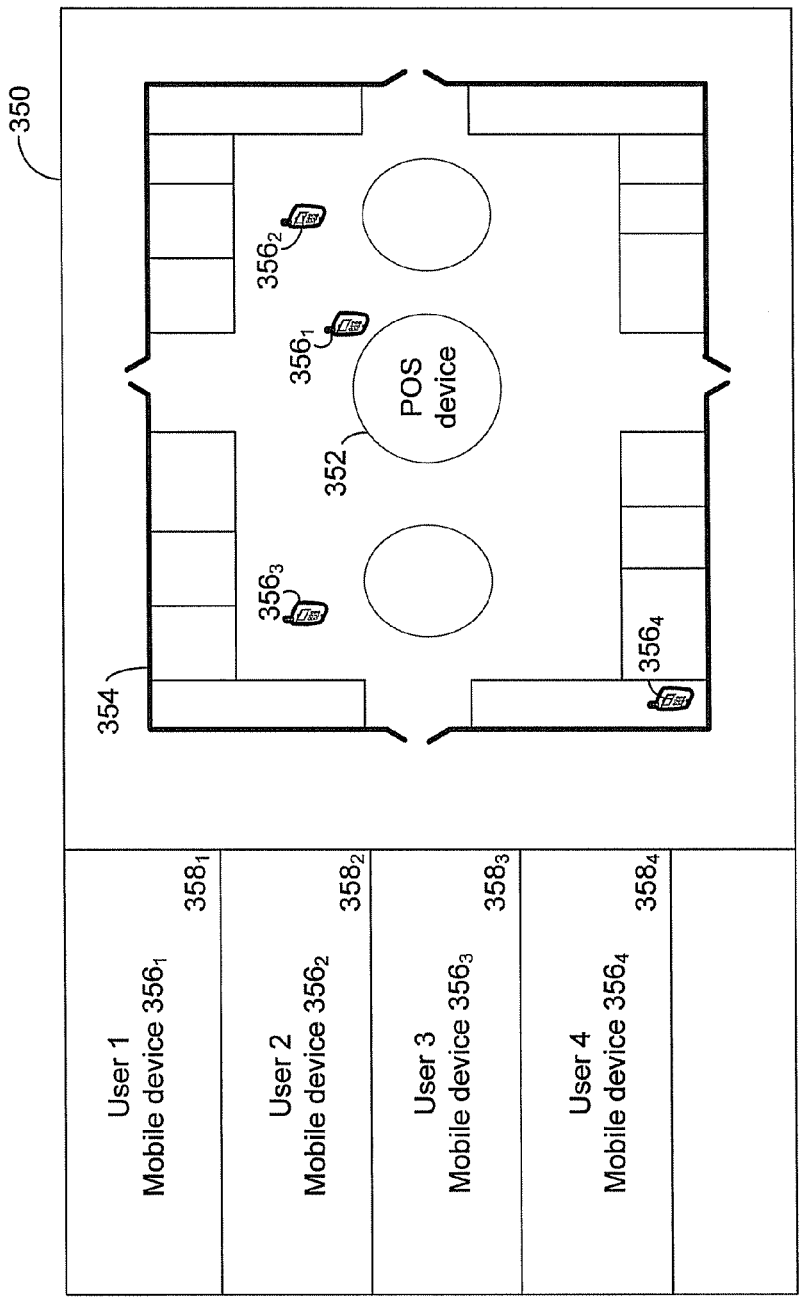
FIG. 3B is a diagram of another exemplary display indicating a location of one or more registered mobile devices on a schematic map, in accordance with an embodiment of the invention.

FIG. 3B is a diagram of another exemplary display indicating a location of one or more registered mobile devices on a schematic map, in accordance with an embodiment of the invention. Referring to FIG. 3B, there is shown a display 350. The display 350 may be a display of the POS device 352.

The display 350 may indicate a POS device 352 and its associated geo-fence 354 of a store, a shopping mall, or a restaurant, for example. The display 350 may indicate a location of one or more mobile devices $356_1 \ldots 356_4$ within the defined geo-fence 354. The display 350 may indicate a plurality of registered users with corresponding mobile devices within the geo-fence 354 in a column on one side of the display. For example, the display 350 may indicate the name, photograph, or other identification of users with mobile devices $356_1 \ldots 356_4$ as tabs $358_1 \ldots 358_4$ respectively. The tabs $358_1 \ldots 358_4$ may be ordered according to a distance of the registered users to the POS device 352. The ordering of the tabs $358_1 \ldots 358_4$ may be updated as the registered users move closer or further away from the POS device 352.

The users of the mobile devices $356_1 \ldots 356_4$ may be registered either with a third party server or with the POS device 200 of a store. The registration of a user may include providing user identification credential information, and payment information, such as credit card information, or other forms of payment information, for example. Once a user is inside the geo-fence 354, the information that is transmitted from the mobile device $356_1$ to the POS device 352 to complete a transaction may not include their payment method details.

The operator of the POS device 352 may be able to zoom in and out of the geo-fence 354 and may select one or more users by clicking that user on the display 350 or clicking a mouse with its pointer on that user in the display 350, for example. When the POS device 352 selects a user on the display 350, the user's details in the column display may also be highlighted. In an alternative embodiment, when the POS device 352 selects a user by clicking on one of the tabs $358_1 \ldots 358_4$, the selected user's location on the display 350 within the geo-fence 354 may be highlighted.

Figure 4:
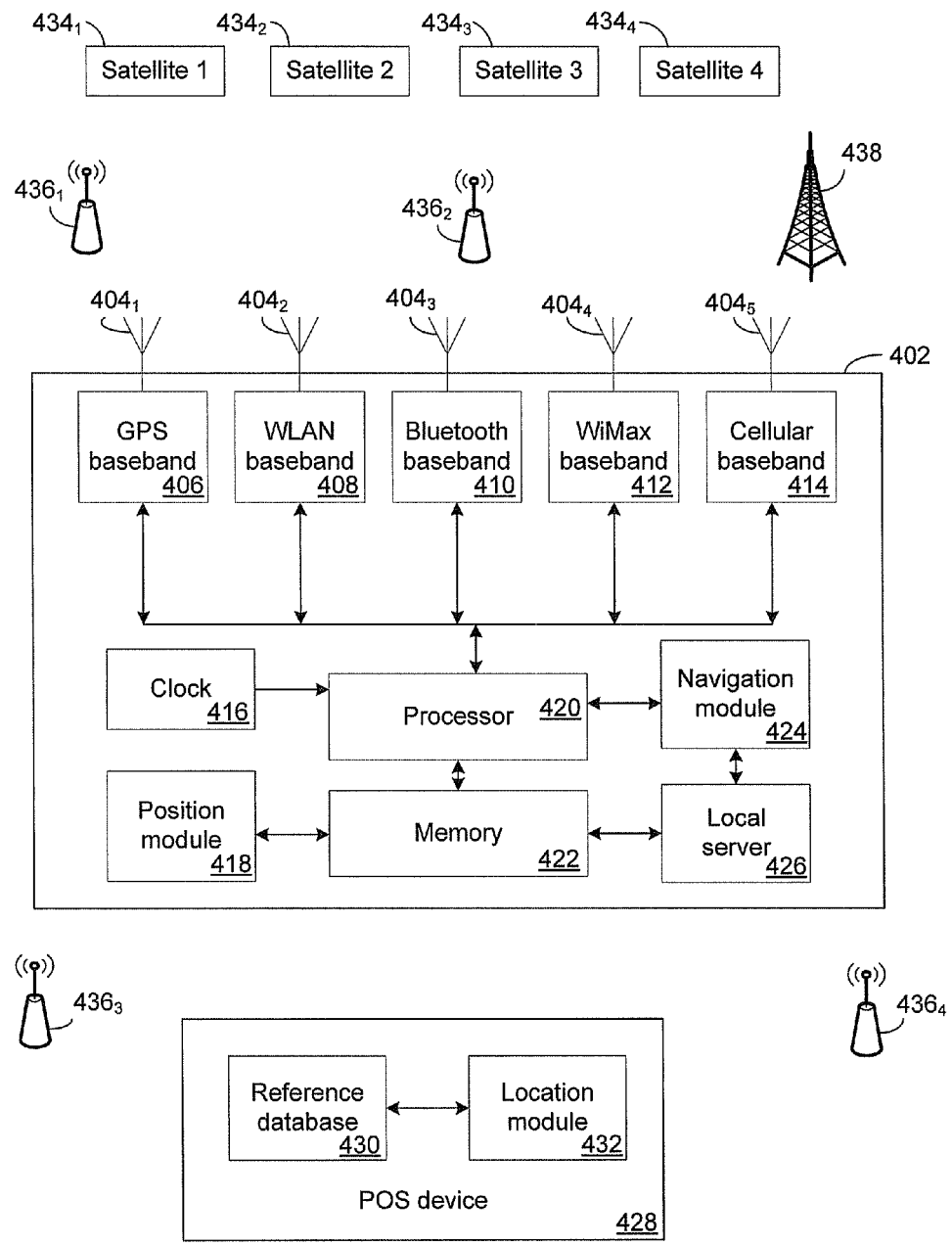
FIG. 4 is an exemplary block diagram illustrating determination of a location of a mobile device based on receiving multipath signals, in accordance with an embodiment of the invention.

FIG. 4 is an exemplary block diagram illustrating determination of a location of a mobile device based on receiving multipath signals, in accordance with an embodiment of the invention. Referring to FIG. 4, there is shown a mobile device 402, a POS device 428, a plurality of satellites $434_1 \ldots 434_4$, a plurality of access points $436_1 \ldots 436_4$, and a cell tower 438. The POS device 428 comprises a reference database 430 and a location module 432.

The mobile device 402 may comprise a plurality of baseband radios and corresponding antennas $404_1 \ldots 404_5$ to receive and transmit signals associated with the respective baseband radios. For example, the mobile device 402 may comprise a GPS radio 406, a WLAN radio 408, a Bluetooth radio 410, a WiMax radio 412, and a cellular radio 414. Notwithstanding, the invention need not necessarily be so limited, and other radios capable of transmitting and receiving signals using one or more standards, such as, NFC, Wi-Fi direct, 60 GHz, radio frequency identification (RFID), HD radio, and/or UWB standards may be utilized without limiting the scope of the invention. Furthermore, the mobile device 402 may comprise a subset of the listed radios in FIG. 4 without limiting the scope of the invention.

The mobile device 402 may further comprise a clock 416, a position module 418, a processor 420, a memory 422, a navigation module 424, and a local server 426. The mobile device 402 may be operable to be used about a geographical area of interest. For instance, the mobile device 402 may be within a vehicle, such as, a passenger car or a commercial truck equipped with radios to receive signals and can move to locations within a geographical area of interest. In indoor environments, a mobile device 402 may be carried by a user. In some embodiments of the invention, the mobile device 402 may be a portable wireless device, a consumer hand-held wireless device, a GPS-enabled media player, or a GPS-enabled laptop, for example.

The mobile device 402 may be operable to extract channel characteristics or parameters from a plurality of received signals and communicate the extracted channel parameters to the POS device 428. The reference database 430 may comprise suitable logic, circuitry, interfaces, and/or code that may be operable to store the received channel parameters. In another embodiment, the POS device 428 may be operable to directly extract channel parameters from a plurality of received signals and store them in the reference database 430.

The plurality of radios 406-414 in the mobile device 402, the plurality of satellites $434_1 \ldots 434_4$, access points $436_1 \ldots 436_4$, and/or cell tower 438 in the geographical area of interest may be Multiple-Input Multiple-Output (MIMO) systems that have multiple antennas which transmit independently and accordingly improve the accuracy by providing more channel characteristics or parameters.

A GPS is a CDMA system that uses Pseudo Noise (PN) codes with embedded data that provide satellite locations and times. The GPS radio 406 may be of commercial quality in some embodiments of the invention and may be used to characterize the GPS communication channel. In some embodiments of the invention, the GPS radio 406 may also provide position values for all other radio communication channel readings.

The processor 420 may comprise suitable logic, circuitry, interfaces, and/or code that may be operable to manage the operations of the plurality of radios 406-414. For example, the processor 420 may instruct one of the plurality of radios 406-414 to scan for a particular signal and perform a channel measurement on a particular frequency with a particular fast Fourier transform (FFT) size and measurement time. The particular radio, for example, WLAN radio 408 may process the received signals to characterize the communication channel of that radio. The processor 420 may then transfer the channel parameters in an appropriate format into local memory 422. The configuration of most of the wireless networks may not change with time since the signal sources, such as cell towers or permanent wireless access points do not move. However, some networks change with time because the signal sources move, such as, GPS satellites make complete orbits of the earth every 24 hours. For those channels that exhibit a time varying dimension, the channels are characterized at different time instances. The clock 416 may be used to time stamp the channel parameters that are stored in the local memory 422. In some embodiments of the invention, the clock 416 may be obtained from a cell tower 438, clocks of GPS satellites $434_1 \ldots 434_4$, or other external sources.

In some embodiments of the invention, the channel parameters stored in memory 422 may be transferred to a reference database 430 at regular time intervals. In some embodiments of the invention, the transfer of data may be carried out by a local server 426 via a wired or wireless connection, such as, using cellular, WLAN, or other wireless method to a POS device 428, which after authentication transfers the data to the reference database 430. In some embodiments of the invention, the POS device 428 may be physically or logically part of an access point $436_1 \ldots 436_4$.

In some embodiments of the invention, the mobile device 402 may be moved around and may scan geographical areas periodically and update the reference database 430 with a current set of channel parameters. In accordance with an embodiment of the invention, when the mobile device 402 takes a new measurement at a particular location and provides newest channel parameters at the current location coordinates, the POS device 428 may compare the newly measured channel parameters with the previously stored channel parameters stored in the reference database 430. Based on the comparison, if there has been a change in the channel parameters associated with the current location coordinates of the mobile device 402, the reference database 430 may be updated. The channel parameters at a particular location may be changed when some previously existing transmitters that were transmitting radio signals to the location were removed altogether or moved to a new location, new transmitters were added and transmit additional signals to the location, new buildings were built that obstruct signal paths, and/or previously existing buildings were demolished and no longer block or reflect signals, for example. For instance, when new measurement data indicates that no data is being received from a previously existing transmitter with a particular media access control (MAC) address and/or other identifying information, it may be concluded that the transmitter may have moved. In such cases, the channel parameters associated with that transmitter may be removed from the reference database 430 in some embodiments. Alternatively, when a transmitter's MAC address and/or other identifying information is detected that was not previously in the reference database 430, the MAC address and/or other identifying information along with the channel parameters associated with that new transmitter may be added to the reference database 430.

In accordance with an embodiment of the invention, a mobile device whose location coordinates are not known, for example, the mobile device 106 may retrieve a first set of parameters from the reference database 430 corresponding to a plurality of signals received at the current location coordinates of the mobile device 106. The plurality of signals may be received from a plurality of signal sources, such as, a plurality of satellites $434_1 \ldots 434_4$, a plurality of access points $436_1 \ldots 436_4$, and/or a cell tower 438. The received plurality of signals may comprise at least one multipath signal. The reference database 430 may store channel parameters corresponding to the plurality of signals received at each of a plurality of location coordinates of the plurality of mobile devices in the network with known location coordinates.

The mobile device 106 may determine its location coordinates based on comparing the retrieved first set of parameters with the stored parameters in the reference database 430. The retrieved first set of parameters and the stored parameters in the reference database 430 may comprise one or more of a time of arrival (TOA) delay extracted using received signal strength indicator (RSSI) transition, a time of arrival delay extracted using signal preamble correlation, a time difference of arrival (TDOA), a transmitted signal strength, an angle of arrival (AOA), equalizer filter coefficients, channel multipath profile, channel fast Fourier transform (FFT) coefficients, beacon signal strength, phase of each pilot tone, amplitude of each pilot tone and/or Doppler shift associated with movement of the plurality of mobile devices, for example, mobile device 402.

In other embodiments of the invention, fixed radios or a plurality of access points $436_1 \ldots 436_4$ that are installed at different locations within the areas of interest may be used. For instance, fixed GPS receivers or other types of wireless RF radios that are networked may be installed at known coordinates on posts and buildings in some embodiments. These fixed radios may characterize radio channels and generate channel parameters, for example GPS channel parameters, such as, delay, phase, range to satellite, and/or satellite IDs and transmit the channel parameters at different time instances to a network server or the POS device 428 that may process the channel parameters further before storing the time, channel parameters and location coordinates in the reference database 430.

In some embodiments of the invention, the position module 418 may be operable to match the received and extracted channel parameters with the channel parameters stored in the reference database 430 to determine the location coordinates of the mobile device 106. The position module 418 may be operable to use interpolation or extrapolation and matching techniques to determine the location coordinates of the mobile device 106.

In other embodiments of the invention, the location coordinates of the mobile device 106 may be performed by the location module 432 in the POS device. In such instances, the mobile device 106 may communicate the received channel parameters to the location module 432. The location module 432 may be operable to compare the received channel parameters with the stored channel parameters in the reference database 430 and use interpolation and matching to determine the location coordinates of the mobile device 106.

The navigation module 424 may be operable to utilize the determined location coordinates of the mobile device 106 for navigation purposes. For example, the navigation module 424 may indicate the location of the mobile device 106 on a map 302 and track the speed and direction of movement of the mobile device 106.

Notwithstanding, the invention may not be so limited, and the reference database 430 and/or the location module 432 may be part of a remote server 114 or servers or the position calculations may be performed by a web-based service, rather than the POS device 428, without limiting the scope of the invention.

Figure 5:
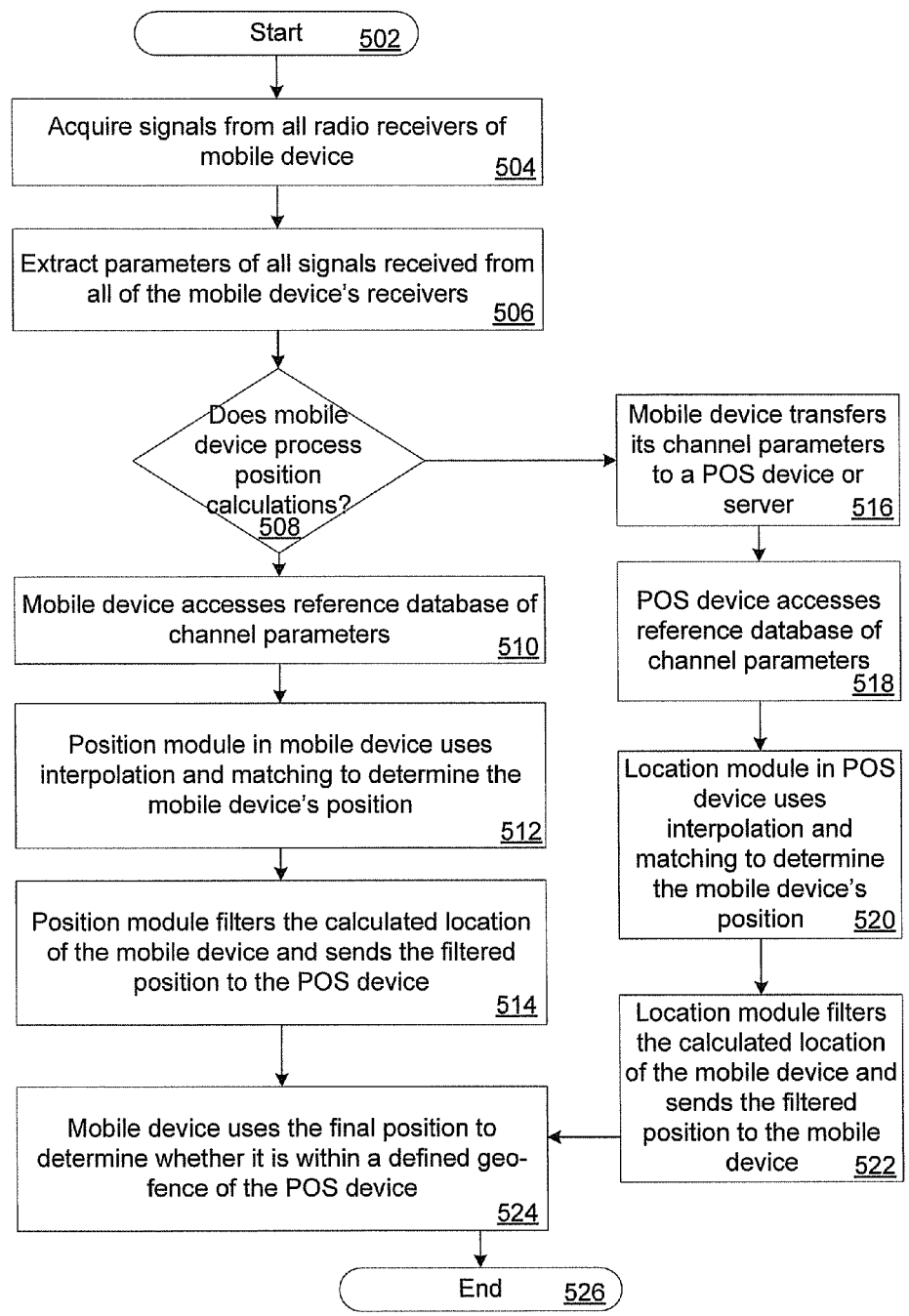
FIG. 5 is an exemplary flow chart illustrating exemplary steps for determination of a location of a mobile device based on receiving multipath signals, in accordance with an embodiment of the invention.

FIG. 5 is an exemplary flow chart illustrating exemplary steps for determination of a location of a mobile device based on receiving multipath signals, in accordance with an embodiment of the invention. Referring to FIG. 5, exemplary steps may begin at step 502.

A user of a mobile device 402 equipped with a plurality of radios 406-414 may direct the mobile device 402 to determine the location coordinates of the user or the mobile device 402. The user may direct or control the mobile device 402 by entering inputs, such as, clicking a mouse button, voice input, tapping a touch screen to select a user interface item, and/or pressing keys on a keyboard, for example. In other embodiments of the invention, the mobile device 402 may initiate the position finding automatically without being directed by the user. The mobile device 402 may also be controlled via gestures and/or voice.

In step 504, the mobile device 402 may receive a plurality of signals at its plurality of radios 406-414. The mobile device 402 in some embodiments may be equipped with radio receivers to receive different types of radio signals from different sources transmitting the signals in different standards. For example, the mobile device 402 may receive signals in GPS, cellular, WLAN, Bluetooth®, NFC, WiMAX, HD Radio™, UWB and/or 60 GHz standards. One or more radios 406-414 may regularly transmit beacon signals, while other radios may enter into a power save mode and require the mobile device 402 to initially transmit a probe request.

In step 506, the mobile device 402 may extract channel parameters of all the signals received by all of the mobile device's radio receivers 406-414. The mobile device 402 may characterize each received signal using one or more channel parameters, such as, a time of arrival delay extracted using RSSI transition, a time of arrival delay extracted using signal preamble correlation, a time difference of arrival, a transmitted signal strength, an angle of arrival, equalizer filter coefficients, channel multipath profile, channel FFT coefficients, beacon signal strength, phase of each pilot tone, amplitude of each pilot tone and/or Doppler shift associated with movement of the plurality of mobile devices. Each of the received plurality of signals may have a unique identifier that may identify the source of the signal. Exemplary identifiers may comprise a MAC ID for WLAN access points $436_1 \ldots 436_4$, a cell tower ID for cellular towers 438, or satellite ID for GPS satellites $434_1 \ldots 434_4$. The mobile device 402 may then store the extracted channel parameters of the received signals and their corresponding identifications of signal sources in the mobile device's memory 422.

In step 508, it may be determined whether the mobile device 402 chooses to determine its location coordinates. In instances where the mobile device 402 chooses to determine its location coordinates, control passes to step 510. In instances where the mobile device 402 chooses not to determine its location coordinates, control passes to step 516.

In step 510, the position module 418 in the mobile device 402 may access the reference database 430 in the POS device 428, which stores the channel parameters. In some embodiments of the invention, the processor 420 may direct a local server 426 of the mobile device 402 to download a subset of the channel parameters stored in the reference database 430 via a wired or wireless connection using cellular, WLAN, or other wireless method. The approximate location of the mobile device 402 may be known from prior position calculations or from beacon signals and cell tower signals received by the mobile device 402. The position module 418 may retrieve a first set of channel parameters measured at the location coordinates near the approximate location of the mobile device 402.

In step 512, the position module 418 may determine the location coordinates of the mobile device 402 based on interpolation or extrapolation and matching. U.S. application Ser. No. 12/852,443 filed Aug. 6, 2010, now issued as U.S. Pat. No. 8,314,736, provides a detailed description of determining the location of a mobile device based on received multipath signals, and is hereby incorporated herein by reference in its entirety.

Since there are potentially several types of radios, and several channel parameters for any given channel, different procedures may be utilized to calculate the location coordinates of the mobile device 402. In some embodiments of the invention, the position module 418 may choose a particular radio, for example, WLAN radio 408, calculate the location coordinates of the mobile device 402 using each of the available channel parameters of that radio, and then weight these location coordinates to calculate final location coordinates using that radio alone. The position module 418 may repeat this procedure for other radios, for example, GPS radio 406, Bluetooth radio 410, WiMax radio 412, and cellular radio 414. The calculated location coordinates based on the channel parameters for each of those radios may then be weighted. The position module 418 may calculate the location coordinates by averaging the weighted positions of the mobile device 402.

In some embodiments of the invention, the weights used in averaging calculated positions of a given radio using different channel parameters may be based on the reliability and accuracy of given channel parameters. For example, when the accuracy of position calculation using channel FFT coefficients are higher than calculations using other channel parameters, the calculated positions using channel FFT coefficients may be given a higher weight. Similarly, in some embodiments of the invention, the weights used in averaging calculated positions using different radios 406-414 may be based on the reliability and accuracy of each radio. For example, if the WLAN radio 408 may provide better positioning accuracies than the GPS radio 406, the position calculated based on channel parameters of WLAN radio signals may be given a higher weight compared to the position calculated based on channel parameters of GPS radio signals. In some embodiments of the invention, the calculated positions for each radio 406-414 may be normalized based on the sensitivity levels to improve accuracy of position calculation. A sensitivity level is the minimum received signal power required to find channel parameters and/or to decode signals.

In step 514, the position module 418 may optionally filter and smooth the calculated location coordinates of the mobile device 402 based on previous positions of the mobile device 402. The mobile device 402 may calculate the mobile device's position and velocity at various time instances based on using two or more positions at which position calculations were performed and the time the mobile device 402 takes to get to one position from another. The velocity information may also be computed from signal amplitude information and Doppler effects. The previous calculated positions and velocity information may be used to filter and smooth the position of the mobile device 402 calculated using interpolation to further reduce positioning errors. The filtering algorithms may use linear 1-tap filters or Kalman filtering, for example. Control then passes to step 524.

In instances where the mobile device 402 chooses not to determine its location coordinates, control passes to step 516. In step 516, the mobile device 402 may transfer the extracted channel parameters to a POS device 428. In step 518, the location module 432 may access the reference database 430 to obtain the channel parameters stored in the reference database 430. The location module 432 may download a subset of the data from the reference database 430. In step 520, the location module 432 may calculate the location coordinates of the mobile device 402 using interpolation and matching. In step 522, the location module 432 may optionally filter the calculated location coordinates of the mobile device 402 and communicate the filtered position back to the mobile device 402. In some embodiments of the invention, the location module 432 may communicate the position information to the mobile device 402 without filtering the position information.

In step 524, the mobile device 402 may use its final calculated location coordinates to determine whether the mobile device 402 is within a defined geo-fence around a POS device. Control then passes to end step 526.

In some embodiments of the invention, the method disclosed in FIG. 5 may not use triangulation when determining the location of the mobile device 402. The specific operations described with respect to FIG. 5 need not necessarily be performed in the exact order shown and described. The specific operations need not necessarily be performed in one continuous series of operations, and different specific operations may be performed in different embodiments. Furthermore, the method disclosed in FIG. 5 may be implemented using several sub-processes, or as part of a larger macro process.

Figure 6:
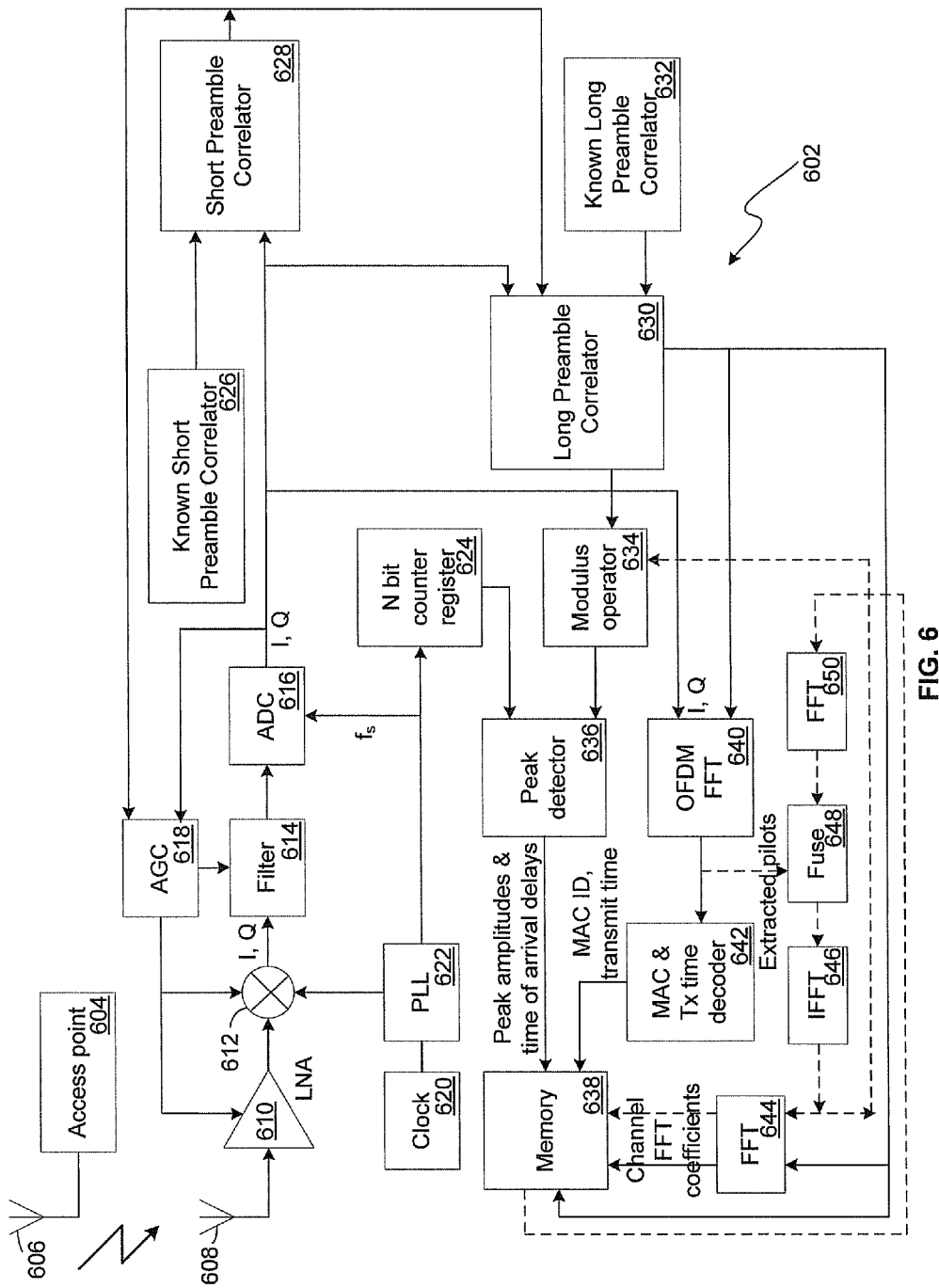
FIG. 6 is an exemplary block diagram illustrating determination of a location of a mobile device based on received signals with known radio transmission patterns, in accordance with an embodiment of the invention.

FIG. 6 is an exemplary block diagram illustrating determination of a location of a mobile device based on received signals with known radio transmission patterns, in accordance with an embodiment of the invention.

Referring to FIG. 6, there is shown an access point 604 and a mobile device 602. The access point 604 comprises an antenna 606 for transmitting and/or receiving signals. The mobile device 602 comprises an antenna 608 for transmitting and/or receiving signals. The mobile device 602 further comprises a low noise amplifier (LNA) 610, a mixer 612, a filter 614, an analog to digital converter (ADC) 616, an automatic gain control (AGC) 618, a clock 620, a phase locked loop (PLL) 622, a N-bit counter register 624, a known short preamble correlator 626, a short preamble correlator 628, a long preamble correlator 630, a known long preamble correlator 632, a modulus operator 634, a peak detector 636, a memory 638, a orthogonal frequency division multiplexed (OFDM) FFT 640, a MAC and transmit time decoder 642, a plurality of FFTs 644 and 650, an inverse FFT 648, and a fuse 648.

In one embodiment of the invention, the wireless LAN standard may be used to demonstrate methods of the invention using preamble correlation. However, the disclosed methods may be applied to any system that has a known structure, for example, a known preamble structure, such as, Bluetooth®, GPS, WLAN, cellular, WiMax, HD Radio™, UWB, RFID, ZigBee, 60 GHz standards, and other RF signals with known structures.

The antenna 606 of the access point 604 may be operable to transmit an RF waveform. The antenna 608 of the mobile device 602 may be operable to receive the RF signal after a delay corresponding to the distance between the mobile device 602 and the access point 604. The LNA 610 may be operable to amplify the received RF signal without increasing the noise level. The PLL 622 may be operable to generate a clock for down conversion as well as the sampling clock frequency ($f_s$) to sample the analog signal at the input of the ADC 616. The clock of the PLL 622 may also be used for the N-bit counter register 624 that may store time delays. The N-bit counter register 624 may be operable to register counts from 0 to (2N−1) and then wrap around back to zero. Therefore, the size of this register, N, may be large enough to represent the time delays that are expected so that time wrap around may be avoided. It should be noted that once the N-bit counter register 624 wraps around to zero, that portion of the time delay may be lost. For instance, when the N-bit counter register 624 only goes up to 100 ms, a time delay of 115 ms may show up as 15 ms in the N-bit counter register 624. When T is the largest time delay that may be expected, the N-bit counter register 624 may be designed to be larger than T plus a delta, where delta is the maximum expected time offset error. The access point 604 may also have a counter that may be synchronized with the N-bit counter register 624 of the mobile device 602 through calibration transmissions.

The mixer 612 may be operable to use the RF output of the LNA 610 and the PLL 622 signal to down convert the RF signal to baseband. The down-converted signal is a complex signal with in-phase (I) and quadrature (Q) components. The filter 614 may be operable to reject unwanted signals. The ADC 616 may be operable to digitize the signal. A time tracking loop may be run so that the ADC sampling points are synchronized with the transmitted waveform to avoid inter-symbol interference. The amplitude of the ADC 616 output may be used by the AGC 618 so that front-end RF block settings may be adjusted and the ADC 616 output captures the main signal.

The short preamble correlator 628 may be operable to correlate its input signal with the signature of the short preamble received from known short preamble correlator 626. The output of the short preamble correlator 628 may adjust the gain control settings of the AGC 618. After the short preamble correlation is complete then the correlation with the long preamble structure is carried out.

The long preamble may comprise two preamble symbols, $T_1$ and $T_2$. The short preamble correlator 628 may also provide a coarse time estimate for the sliding window of the long preamble correlator 630 so that the correlation window starts just before $T_1$. The long preamble correlator 630 may be operable to correlate the I and Q received signal components against $T_1$ or against both $T_1$ and $T_2$ together by using the signature of the long preamble received from known long preamble correlator 632. This is a complex correlation and the output of the long preamble correlator 630 therefore is a complex signal with real and imaginary components. The complex output of the long preamble correlator 630 may in some embodiments be stored in memory 638 to represent channel FFT coefficients, or be used together with extracted pilots to calculate more accurate channel FFT coefficients. A modulus operation is then carried out by the modulus operator 634 on the output of the long preamble correlator 630, where the absolute value magnitude of the complex signal is calculated.

After a time delay, which may be a system parameter, the OFDM FFT 640 may be operable to perform FFT on the OFDM signal symbol. The MAC address or MAC ID of the device corresponding to the received RF signal may be computed by the OFDM FFT 640 and a MAC and transmit time decoder 642. The OFDM FFT 640 may be operable to use the output of the long preamble correlator 630 in order to determine when to start the FFT. The OFDM FFT 640 may also discard the cyclic prefix. The MAC address may then be saved in memory 638 so that stored time delays may correspond to a particular access point's MAC address. The transmission time, represented by the transmitter's counter value at transmission, may be stored in the memory 638. The MAC and transmit time decoder 642 may also retrieve the transmission time with an FFT and store it in memory 638. The difference between the transmitter's counter value at transmission and the receiver's peak detection counter value may represent time of arrival plus system delays and synchronization offsets, which may be calibrated and compensated for. The data is also decoded with an equalizer, which uses the channel coefficient estimates to perform division and multiplication in the FFT domain to decode the data. The correlators do not have to run all the time and may enter a sleep mode once the peak detector finds the first peak.

The pilots may be extracted by an FFT 644 and used to improve the channel estimate and update the peak detector's 636 output. The extracted pilots may be fused by the fuse component 648 with the FFT calculated by the FFT module 644 of the previously stored long preamble correlator 630 output. This fusion step may involve using weights to change the values of the FFT of the long preamble correlator 630 output at the pilot locations. The result may then be processed by an inverse FFT (IFFT) 646 step and the improved estimates may then be fed back to the modulus operator 634 and the peak detector 636. The channel FFT coefficients may be calculated by the FFT module 644 and stored in the memory 638.

In accordance with an embodiment of the invention, the location coordinates of the mobile device 602 may be determined based on a calculated time of travel of a received signal from one or more access points 604 to the mobile device 602. The time of travel of the received signal may be calculated based on correlating the received signal with a corresponding received signal with a similar known radio transmission pattern. For example, the time of travel of the received signal may be calculated based on correlating a preamble of the received signal, for example, signal received at short preamble correlator 628 or long preamble correlator 630 with a preamble of the corresponding received signal with the similar known radio transmission pattern, for example, signal output by the known short preamble correlator 626 or known long preamble correlator 632 respectively.

U.S. application Ser. No. 12/833,938 filed Jul. 9, 2010, now issued as U.S. Pat. No. 8,344,949, provides a detailed description of determining the location of a mobile device based on received signals with known radio transmission patterns, and is hereby incorporated herein by reference in its entirety. The mobile device 602 may be operable to use correlation with the preamble training structure to determine the time delay between the access point 604 and the mobile device 602. In this example, the mobile device 602 employs direct conversion where the carrier frequency is directly converted to two baseband signals; in-phase I and quadrature Q, which are then sampled by the ADC 616. However, other receiver architectures, such as, heterodyne or super heterodyne may be used, where an ADC is used to sample the full signal bandwidth of interest without limiting the scope of the invention.

Figure 7:
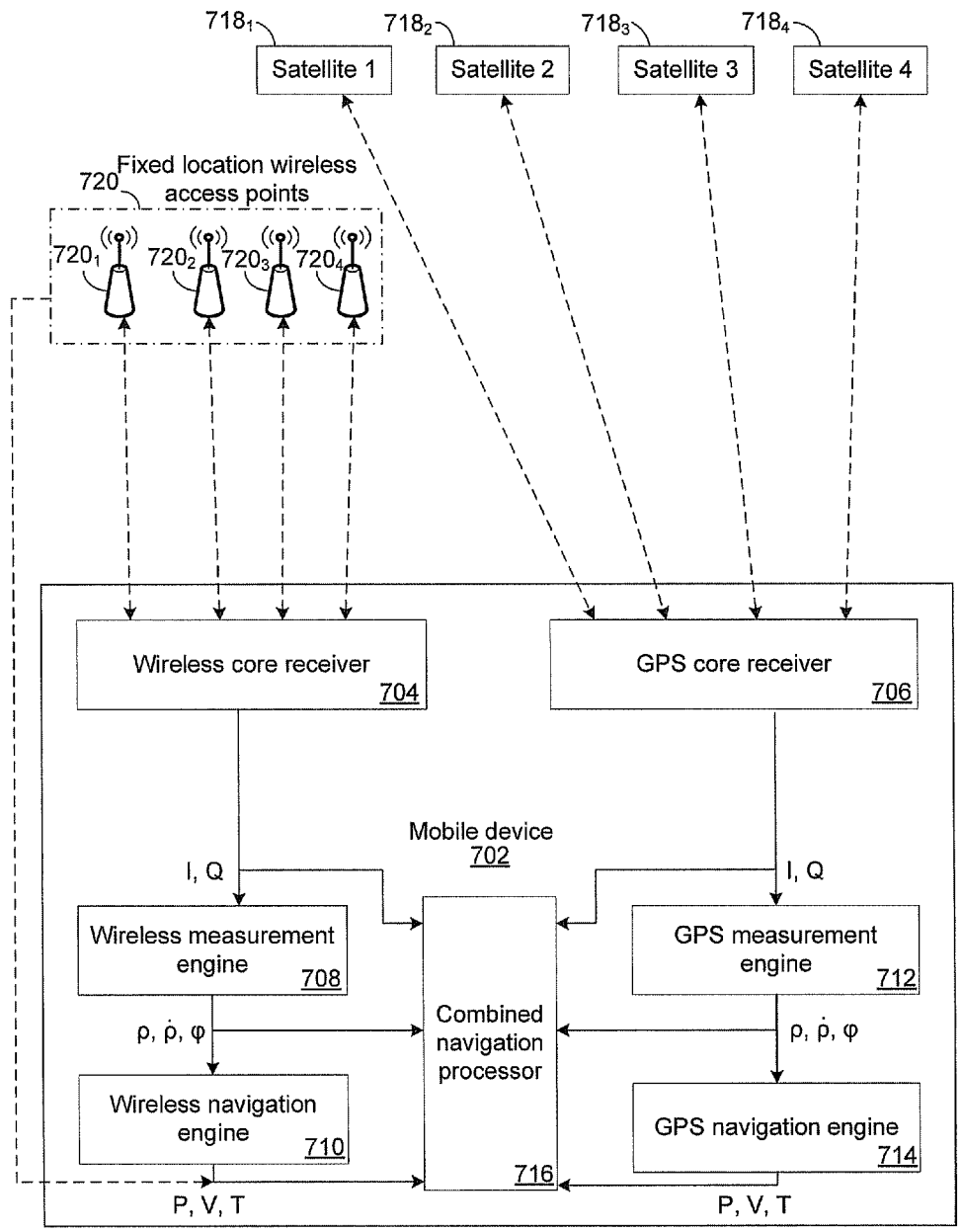
FIG. 7 is an exemplary block diagram of a combined GPS and wireless positioning system, in accordance with an embodiment of the invention.

FIG. 7 is an exemplary block diagram of a combined GPS and wireless positioning system, in accordance with an embodiment of the invention. Referring to FIG. 7, there is shown a mobile device 702, a plurality of satellites $718_1 \ldots 718_4$, and a plurality of wireless access points 720.

The mobile device 702 may comprise a wireless core receiver 704, a GPS core receiver 706, a wireless measurement engine 708, a wireless navigation engine 710, a GPS measurement engine 712, a GPS navigation engine 714, and a combined navigation processor 716.

The plurality of wireless access points $720_1 \ldots 720_4$ may be at fixed locations and equipped with GPS and deployed in towns and cities to provide wireless access to the Internet or to cellular networks, and also provide GPS assistance data via a GPS assistance manager. Since the location of these access points is usually fixed and known, they may also provide GPS differential information via a GPS differential correction manager.

In accordance with one embodiment of the invention, RFID readers may be used in a similar fashion as the plurality of wireless access points 720 to locate a mobile device 702 that has a tag attached to it. The RFID readers may be fixed location pre-assigned readers or mobile readers that are operable to determine their positions such as by an integrated or coupled GPS or other GNSS device.

The GPS core receiver 706 may comprise suitable logic, circuitry, code, and/or interfaces and may be operable to receive GPS signals from the plurality of satellites $718_1 \ldots 718_4$. The GPS core receiver 706 may be operable to receive GPS RF signals from all visible satellites $718_1 \ldots 718_4$, down-convert the signals, correlate and despread the signals using the locally generated codes, and provide the baseband In-phase (I) and Quadrature (Q) symbols to the GPS measurement engine 712.

The GPS measurement engine 712 may comprise suitable logic, circuitry, code, and/or interfaces and may be operable to process the I and Q symbols and to generate the GPS raw measurements such as the pseudoranges, Dopplers, and integrated carrier phase ($\rho$, $\dot{\rho}$, $\phi$) for all the visible satellites $718_1 \ldots 718_4$. These raw measurements are then provided to the GPS navigation engine 714.

The GPS navigation engine 714 may comprise suitable logic, circuitry, code, and/or interfaces and may be operable to receive the GPS raw measurements and calculate position, velocity, and time (P, V, T) based on Kalman filtering to achieve better estimates.

The wireless core receiver 704 may comprise suitable logic, circuitry, code, and/or interfaces and may be operable to determine the location coordinates of the mobile device 702 based on combining the information received from the GPS core receiver 706 with information from other wireless positioning data. The wireless core receiver 704 may implement one or more wireless protocols such as cellular, WLAN, Bluetooth®, WiMax, NFC, HD Radio, RFID, UWB, RFID, 60 GHz or ZigBee®, for example. The wireless positioning data may be obtained with triangulation schemes that use time of arrival or phase with wireless technologies such as WLAN, Bluetooth®, or RFID, for example. By combining positional information from multiple sources the effects of shadowing, fading and multipath interference may be reduced. The wireless core receiver 704 may receive the wireless RF signal, down-convert, demodulate, and decode the signal to generate the baseband I and Q symbols.

The wireless measurement engine 708 may comprise suitable logic, circuitry, code, and/or interfaces and may be operable to receive the I and Q symbols and generate the raw measurements for navigation. Such measurements may include pseudoranges, Dopplers, and integrated carrier phases ($\rho$, $\dot{\rho}$, $\phi$) for all the wireless access points in the region.

The wireless navigation engine 710 may comprise suitable logic, circuitry, code, and/or interfaces and may be operable to receive the raw navigation measurements and calculate position, velocity, and time (P, V, T).

The combined navigation processor 716 may comprise suitable logic, circuitry, code, and/or interfaces and may be operable to implement various signal processing and optimization algorithms in order to combine different data from the GPS core receiver 706 with the data from the wireless core receiver 704. Examples of such algorithms may comprise Weighted Least Squares and Extended Kalman Filters. The actual architecture and implementation mechanism of such signal processing algorithms may depend on the type of data provided to the combined navigation processor 716. Notwithstanding, other suitable algorithms may be utilized without limiting the scope of the invention.

In accordance with a first embodiment of the invention, the wireless access points 720 may provide GPS assistance data to the mobile device 702. Such assistance data may comprise reference time, the IDs and ephemerides of the satellites to be tracked, and/or decoded navigation data, for example.

In accordance with an alternative or complementary second embodiment of the invention, the wireless access points 720 may have its true location and its own GPS measured location. The wireless access points 720 may accordingly calculate the measured range errors for each of the visible satellites $718_1 \ldots 718_4$. The wireless access points 720 may provide its calculated errors to the mobile device 702, which may then use the calculated errors as differential correction terms and cancel out the common errors to achieve better accuracy.

In accordance with an alternative or complementary third embodiment of the invention, the final P, V, T solution of the GPS core receiver 706 may be provided to the combined navigation processor 716, which may then combine it with the data received from the wireless core receiver 706.

In accordance with an alternative or complementary fourth embodiment of the invention, the raw GPS measurements such as pseudoranges, Dopplers, and carrier phases may be directly provided to the combined navigation processor 716.

In accordance with an alternative or complementary fifth embodiment of the invention, the combined navigation processor 716 may receive the actual I and Q symbols directly from the GPS core receiver 706 and/or from the wireless core receiver 704.

In accordance with an alternative or complementary sixth embodiment of the invention, the final P, V, T solution obtained independently by the wireless core receiver 706 may be provided to the combined navigation processor 716, which may then combine it with the data received from the GPS core receiver 706.

In accordance with an alternative or complementary seventh embodiment of the invention, the raw navigation measurements such as pseudoranges, Dopplers, and carrier phases, generated by the wireless core receiver 704 may be directly provided to the combined navigation processor 716.

In accordance with another alternative or complementary embodiment of the invention, the combined navigation processor 716 may be inside one of the wireless access points 720 instead of the mobile device 702. In such a scenario, the signal processing and optimization algorithms for combining different data from the GPS core receiver 706 with the data from the wireless core receiver 704 may be carried out inside the wireless access points 720. This offloads the mobile device 702 from having to perform the processing, but it does require the mobile device 702 to send its data to the wireless access points 720 and the wireless access points 720 to send its processing results back to the mobile device 702.

One example of the algorithm implemented by the combined navigation processor 716 may be an extended Kalman filter (EKF). The EKF algorithm is an iterative process by which a vector of parameters is optimally estimated given a dynamical model and a set of measurements at consecutive time steps. It uses a non-linear filter function that effectively tries to combine the measurements in some optimal fashion in order to obtain the intended estimate.

In accordance with an embodiment of the invention, the location coordinates of the mobile device 702 may be determined based on receiving GPS information from a plurality of GPS satellites 718 and a weighted average of a plurality of assistance data from one or more access points 720. The weight assigned to each of the plurality of assistance data may be determined based on one or more of a reception characteristic of each of the one or more access points 720, a relative distance, a relative received power level and/or a relative received phase difference between the mobile device 702 and each of the one or more access points 720. The plurality of assistance data received from the one or more access points 720 may correspond to one or more standards comprising one or more of WLAN, Bluetooth, WiMax, HD Radio, UWB, GPS, cellular, NFC, and/or 60 GHz standards.

U.S. application Ser. No. 11/940,219 filed Nov. 14, 2007, now issued as U.S. Pat. No. 8,193,978, provides a detailed description of determining the location of a mobile device based on assisted GPS, and is hereby incorporated herein by reference in its entirety.

Figure 8:
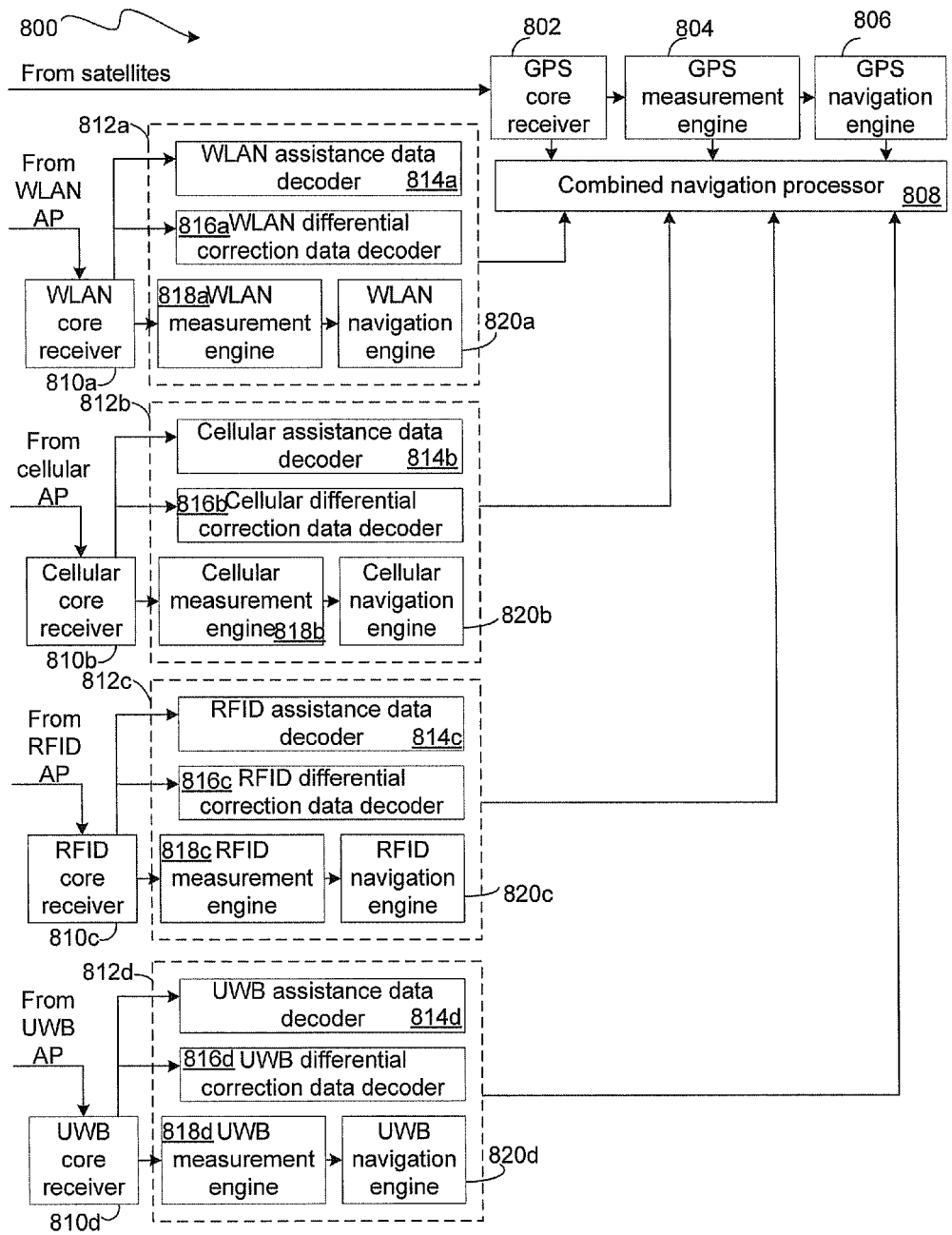
FIG. 8 is another exemplary block diagram of a combined GPS and wireless positioning system, in accordance with an embodiment of the invention.

FIG. 8 is another exemplary block diagram of a combined GPS and wireless positioning system, in accordance with an embodiment of the invention. Referring to FIG. 8, there is shown a mobile device 800. The mobile device 800 may comprise a WLAN core receiver 810a, a cellular core receiver 810b, a RFID core receiver 810c, and a UWB core receiver 810d (collectively receivers 810), a WLAN controller 812a, a cellular controller 812b, a RFID controller 812c, and a UWB controller 812d (collectively controllers 812), a GPS core receiver 802, a GPS measurement engine 804, a GPS navigation engine 806, and a combined navigation processor 808.

The WLAN controller 812a may comprise a WLAN assistance data decoder 814a, a WLAN differential correction data decoder 816a, a WLAN measurement engine 818a, and a WLAN navigation engine 820a. The cellular controller 812b may comprise a cellular assistance data decoder 814b, a cellular differential correction data decoder 816b, a cellular measurement engine 818b, and a cellular navigation engine 820b. The RFID controller 812c may comprise a RFID assistance data decoder 814c, a RFID differential correction data decoder 816c, a RFID measurement engine 818c, and a RFID navigation engine 820c. The UWB controller 812d may comprise a UWB assistance data decoder 814d, a UWB differential correction data decoder 816d, a UWB measurement engine 818d, and a UWB navigation engine 820d.

The plurality of assistance data decoders 814a . . . d may be collectively referred to as assistance data decoders 814 and may be operable to process the received assistance data from the plurality of access points. The plurality of differential data decoders 816a . . . d may be collectively referred to as differential correction data decoders 816 and may be operable to decode differential GPS data based on determining a difference between their known locations and the calculated GPS locations. The plurality of measurement engines 818a . . . d may be collectively referred to as measurement engines 818 and may be operable to receive the I and Q symbols and generate the raw measurements for navigation. The plurality of navigation engines 820a ... d may be collectively referred to as navigation engines 820 and may be operable to receive the raw navigation measurements and calculate position, velocity, and time.

The mobile device 800 may be operable to communicate with different types of GPS-equipped wireless access points, for example, a WLAN access point, a cellular access point, a RFID reader access point, and a UWB access point. The characteristics of these wireless access points may differ in terms of their signal frequency, power, signal source location, and protocol, and may accordingly exhibit different shadowing, fading and multipath effects, and combining their signals may reduce the errors caused by these effects. For example, signals from different locations experience different multipath errors and averaging may reduce the multipath errors. The combining algorithm may use weights based on criteria such as RSSI or power strength, and approximate location, for example. For example, at indoor locations the signals and triangulation methods of WLAN and RFID may receive more weight than GPS because GPS is limited indoors while WLAN and RFID are not. At outdoor locations, however, GPS signals may be weighted more than WLAN and RFID. The access points may have GPS receivers and provide the information they receive to the combined navigation processor 808. There may also be hybrid approaches where for example, some RFID readers or WLAN access points may have GPS receivers while others may use triangulation or other methods. The access points that have a GPS receiver may have the option of providing differential correction or assistance data.

The mobile device 800 may download maps related to its position and may use information in the maps to adjust the weights it applies to the position information it receives. The maps may include interior features, for example, walls as well as exterior features, for example, buildings or hills. For example, if the mobile device 800 is in a position that would, based on the configuration of the surrounding buildings, be susceptible to multipath interference of GPS signals, the GPS information may receive a reduced weight by the combined navigation processor 808. The maps may be provided from a map server that may be a component of an access point.

The mobile device 800 may also combine assistance data and other information from access points of the same type. This is possible since the wireless communication mechanisms are packet-based and a particular receiver may switch between two access points of the same type. For example, the mobile device 800 may combine the positioning information it receives from two or more UWB access points by weighting their information according to various criteria, for example, signal or power strength, and/or approximate location. For example, higher strength signals may receive larger weights than lower strength signals because they are presumed to be closer to the mobile device 800. This example may also be applied to other types of access points, for example, averaging information from two or more access points of type RFID or ZigBee® or WLAN or cellular or Bluetooth®.

Figure 9:
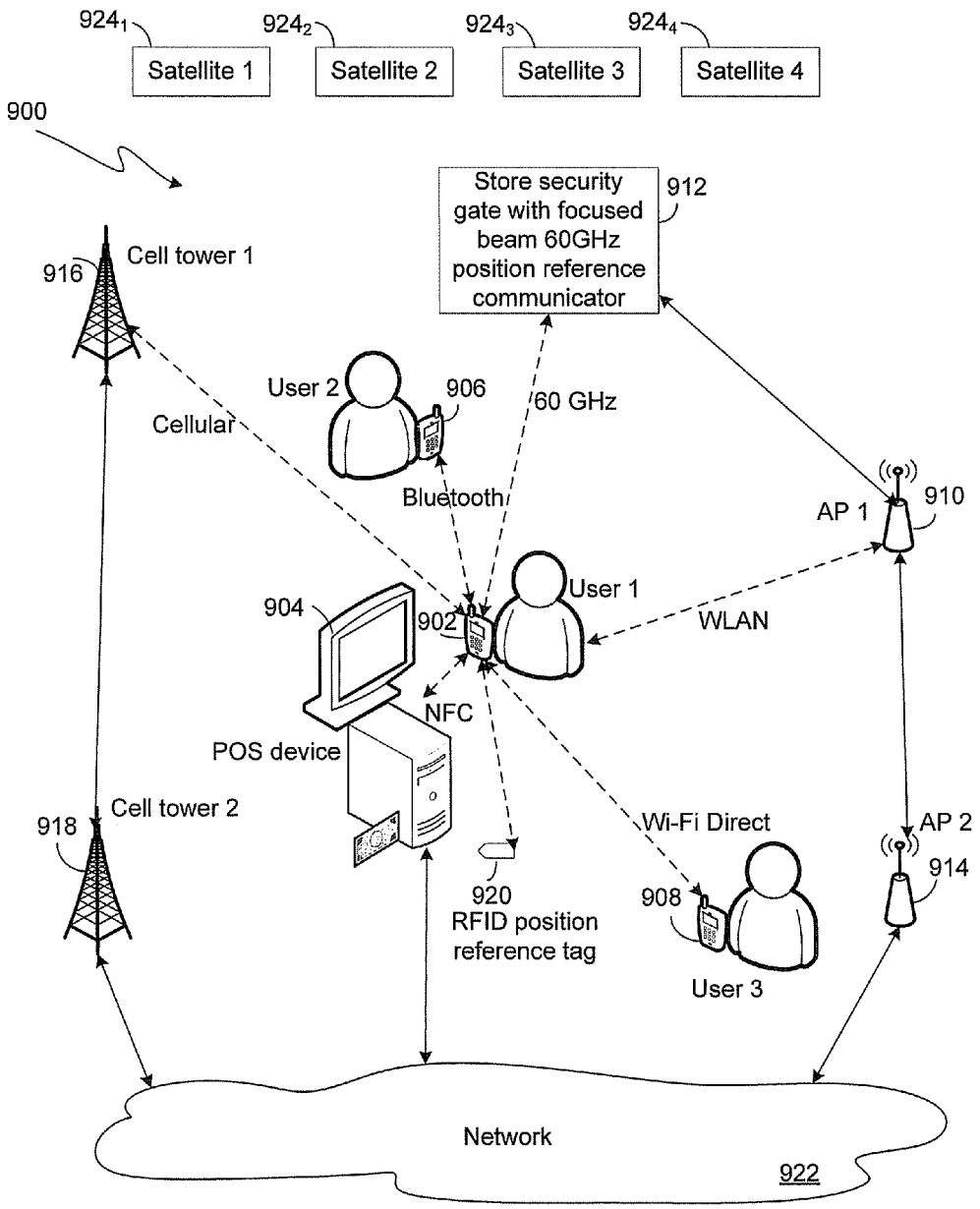
FIG. 9 is an exemplary diagram illustrating determination of a location of a mobile device based on receiving positioning assistance data using short range wireless communication protocols, in accordance with an embodiment of the invention.

FIG. 9 is an exemplary diagram illustrating determination of a location of a mobile device based on receiving positioning assistance data using short range wireless communication protocols, in accordance with an embodiment of the invention. Referring to FIG. 9, there is shown a user 1 with mobile device 902, a POS device 904, a user 2 with a mobile device 906, a user 3 with a mobile device 908, a plurality of access points AP1 910 and AP2 914, a 60 GHz position reference communicator 912, a plurality of cellular towers 916 and 918, a RFID position reference tag 920, a network 922, and a plurality of satellites $924_1 \ldots 924_4$.

The mobile device 902 may be operable to receive positioning assistance data from a plurality of position reference devices 906-920 via short-range communication protocols and weight their positioning and assistance data based on how far they are from the mobile device 902. If the positioning reference devices are moving, then the weights may also take into account how recently the positioning reference devices were calibrated. The mobile device 902 of user 1 may use its NFC communicator to power up a passive NFC tag at a POS device 904 and receive positioning assistance data from the POS device 904. The mobile device 902 may use its RFID reader to receive positioning assistance data from an RFID position reference tag 920. The mobile device 902 of user 1 may use its WLAN radio to receive positioning assistance data from the access point AP1 910 that is transmitting with low power to reduce its range. The mobile device 902 may use its 60 GHz transceiver to receive positioning assistance data from the 60 GHz position reference communicator 912 of a store security gate, for example. The mobile device 902 may use its cellular receiver to receive positioning assistance data from a reference cellular tower 916. In one embodiment of the invention, user 3 has a mobile device 908 that uses Wi-Fi Direct to transmit positioning assistance data to the mobile device 902 of user 1. In another embodiment of the invention, a user 2 has a mobile device 906 that uses Bluetooth to transmit positioning assistance data to the mobile device 902 of user 1. The mobile device 902 of user 1 may then combine the positioning assistance data from different position reference devices based on a confidence measure.

The accuracy of the positioning assistance data may increase as the position reference device is closer to a mobile device 902. Accordingly, the mobile device 902 may choose to use the positioning assistance data of the nearest position reference device. For example, the mobile device 902 may select to receive the positioning assistance data from the NFC tag at the POS device 904 and may ignore the remaining positioning assistance data because the range of NFC is small and the mobile device 902 has to be close to the NFC tag in order to be able to communicate with it. Alternatively, rather than ignoring the remaining positioning assistance data from the other position reference devices, the mobile device 902 may assign weights to one or more based on the range of the short-range communication protocol. For example, the reference position and positioning assistance data that is received via an NFC communication protocol may be given the highest weight. Similarly, smaller weights may be given to positioning assistance data that are received from a position reference device via a cellular protocol because of the large range of cellular signals. The weights may also take into account the strength of the received signals. For example, if two position reference devices are using the same short-range protocol but the mobile device 902 receives a stronger signal from one compared to the other, the stronger signal reference may be given a higher weight.

In accordance with an embodiment of the invention, the time when positioning assistance data was received is noted when the position reference device is moving because the positioning errors may accumulate over time until they are removed or reduced by a nearby position reference device. A greater weight may be assigned to a recently calibrated moving position reference device based on the received timestamp at which they were calibrated. For example, if the position of the mobile device 908 of user 3 has been more recently calibrated compared to the mobile device 906 of user 2, the mobile device 902 of user 1 may then choose to accept only the positioning assistance data of user 3's mobile device 908, or may assign a higher weight to the positioning assistance data received from mobile device 908. In another embodiment of the invention, the GPS assistance data of user 3's mobile device 908 may be more accurate because it is more recently updated compared to the determined TOA, TDOA, RSSI and/or AOA calculated using one or more methods. The mobile device 908 may then transmit a timestamp for each of its positioning assistance data. The mobile device 902 may then receive the positioning assistance data from mobile device 908 and assign it a higher weight compared to the determined TOA, TDOA, RSSI and/or AOA calculated using one or more methods.

In accordance with an embodiment of the invention, the determined location coordinates of the mobile device 902 may be recalibrated based on receiving a plurality of positioning assistance data from one or more position reference devices, for example, a POS device 904 via passive and active NFC tags, a mobile device 906 via Bluetooth, a mobile device 908 via Wi-Fi Direct, a plurality of access points AP1 910 and AP2 914 via WLAN, a 60 GHz position reference communicator 912 via 60 GHz standard or other high frequency narrow beam methods, a plurality of cellular towers 916 and 918 via cellular standards, and/or a passive or active RFID position reference tag 920 using short range wireless communication protocols.

Figure 10:
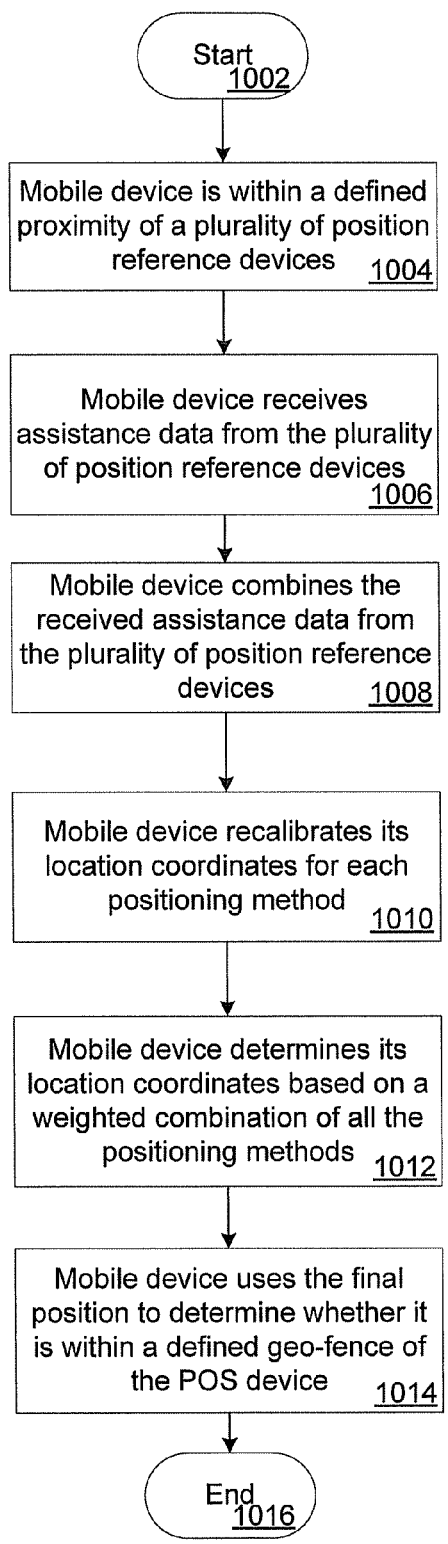
FIG. 10 is an exemplary flow chart illustrating exemplary steps for determination of a location of a mobile device based on receiving positioning assistance data using short range wireless communication protocols, in accordance with an embodiment of the invention.

FIG. 10 is an exemplary flow chart illustrating exemplary steps for determination of a location of a mobile device based on receiving positioning assistance data using short-range wireless communication protocols, in accordance with an embodiment of the invention. Referring to FIG. 10, exemplary steps may begin at step 1002.

In step 1004, the mobile device 902 may be within a defined proximity of a plurality of position reference devices, for example, a POS device 904, a mobile device 906, a mobile device 908, a plurality of access points AP1 910 and AP2 914, a 60 GHz position reference communicator 912, a plurality of cellular towers 916 and 918, and/or a RFID position reference tag 920. In step 1006, the mobile device 902 may receive positioning assistance data from the position reference devices via short-range wireless protocols. The positioning assistance information transmitted by the position reference devices may include their identification (ID), general information such as their type and whether they are stationary or moving, their short-range communication protocol, their pre-stored or calculated position information, the timestamp for when their own reference position was calibrated, and positioning assistance data for different methods such as GPS and/or Wi-Fi.

In step 1008, the mobile device 902 may combine the positioning assistance data received from the plurality of position reference devices by weighting them as described with respect to FIG. 9. In step 1010, the mobile device 902 may recalibrate its location coordinates for each positioning method based on receiving a plurality of positioning assistance data from one or more position reference devices so that the calculated position from each method coincides with the reference position, and the position of the mobile device 902 is set to the reference position.

In step 1012, the mobile device 902 may combine the different positioning assistance data by weighting each appropriately. The normalized weights may use equal weights, use weights based on historical accuracy of each positioning method, or use a confidence measure for each positioning method. For example, the confidence in a GPS positioning method may be high, if many satellites are detected by the GPS receiver of the mobile device's 902. The steps of determining location coordinates for each positioning method, and computing a combined position of the mobile device 902 may be repeated at regular time intervals, until the mobile device 902 is within a defined proximity of a new position reference device that was not one of the initial plurality of position reference devices. The mobile device 902 may then receive new positioning assistance data from the new position reference device and control may return to step 1006. In step 1014, the mobile device 902 may use its final calculated location coordinates to determine whether the mobile device 902 is within a defined geo-fence around a POS device 904. Control then passes to end step 1016.

Figure 11:
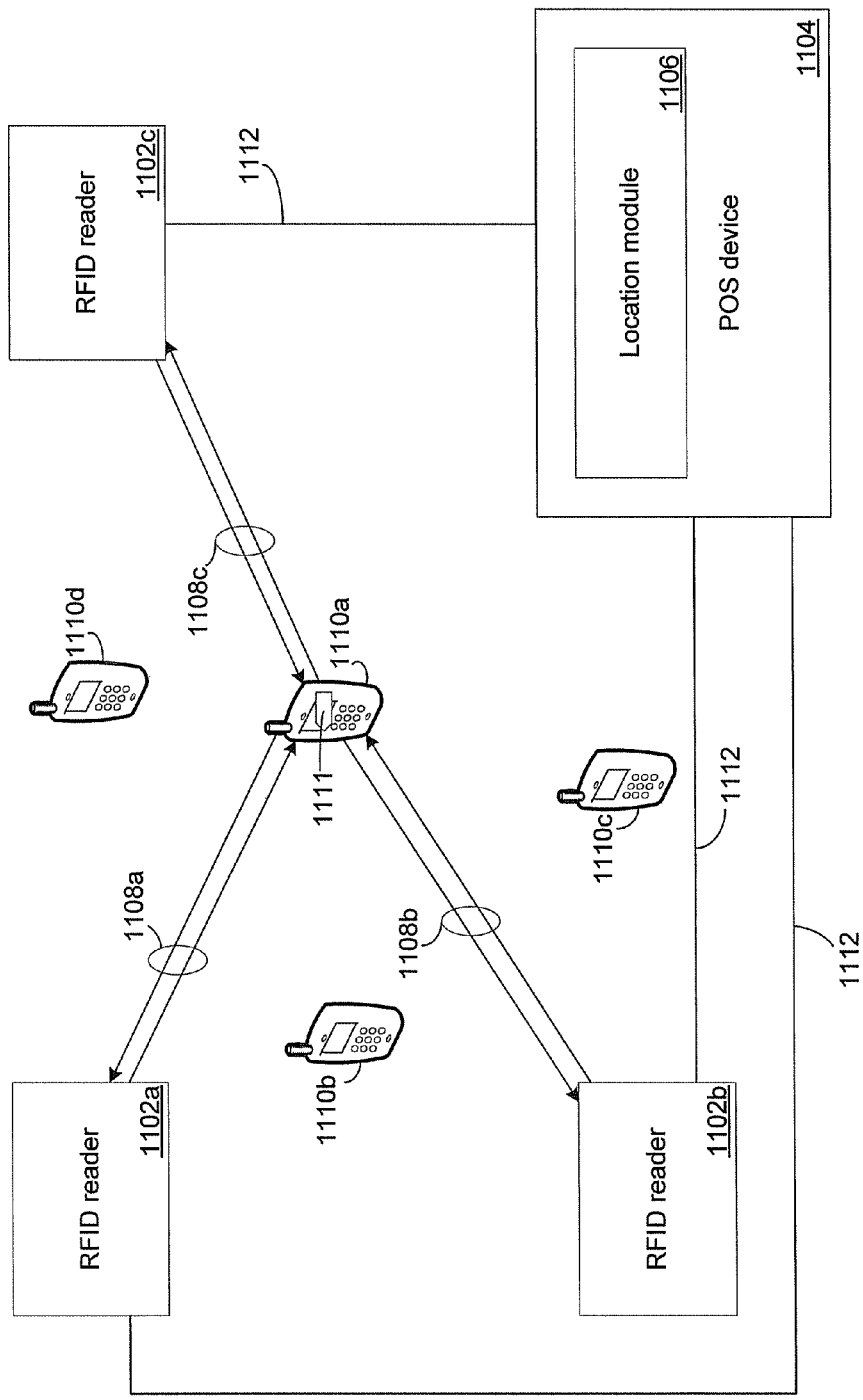
FIG. 11 is an exemplary block diagram of a RFID location system, in accordance with an embodiment of the invention.

FIG. 11 is an exemplary block diagram of a RFID location system, in accordance with an embodiment of the invention. Referring to FIG. 11, there is shown a plurality of RFID readers 1102a-c, a POS device 1104, and a plurality of mobile devices 1110a-c. The mobile device 1110a may comprise a RFID tag 1111. The POS device 1104 may comprise a location module 1106.

The plurality of RFID readers 1102a-c may comprise suitable logic, circuitry, interfaces, and/or code that may be operable to transmit RF signals. The RF signals may address or otherwise specify a particular tag to be accessed. For example, the RFID readers 1102a-c may communicate with specific RFID tags, for example, RFID tag 1111 by sending a signal to which all RFID tags respond. The RFID readers 1102a-c may detect collisions and request that only specific RFID tags respond. For instance, the RFID readers 1102a-c may request responses only from RFID tags with a most significant bit (MSB) in the ID equal to zero. The RFID tags may receive the signals from the RFID readers 1102a-c and only respond if certain conditions are met. For instance, a RFID tag may only respond if one or more bits in the RFID tag ID match one or more bits in a RFID reader reference signal.

The RF signals from each of the plurality of RFID readers 1102a-c may be backscattered by the RFID tag 1111 within each RFID reader's range. The backscattered signals 1108a-c from the RFID tag 1111 may be modified or modulated to include the RFID tag's identification number or code or the tag ID. Each RFID reader 1108a-c may receive the backscattered signals 1108a-c and extract the tag ID. Accordingly, each RFID reader 1102a-c may determine which tags are within the RFID reader's range. Additionally, each RFID reader 1102a-c may associate a backscattered signal with particular tag IDs. The location of a particular RFID tag, or group of RFID tags, may be determined by using measured parameters obtained from the backscattered signals 1108a-c that may be used to determine positioning data, for example, received signal phase or signal power, which may be referred to as measured position parameters.

The location of a RFID tag 1111 may be determined by transmitting three or more RF signals from three or more different locations. For example, RFID reader 1102a may transmit a first RF signal, and the RF signal may be received and backscattered by RFID tag 1111. Accordingly, the RFID reader 1102a may receive a backscattered signal in response to the transmitted RF signal as shown at 1108a. Similarly, RFID readers 1102b and 1102c may transmit a second and third RF signals, and the RF signals may be received and backscattered by RFID tag 1111. Accordingly, the RFID readers 1102b and 1102c may receive backscattered signals in response to the transmitted RF signals as shown at 1108b and 1108c.

The measured position parameters for determining the location of RFID tag 1111 may be obtained by processing each backscattered signal. For example, the RFID readers 1102a-c may receive the backscattered signals from RFID tag 1111 and extract information from the backscattered signals 1108a-c to determine the distance between the RFID reader and the RFID tag 1111. In accordance with an embodiment of the invention, one or more of the following position parameters may be measured from the backscattered signals, for example, phase, power or received signal strength, angle of arrival, or time of arrival. One or more of these measured position parameters may be used to determine the distance between the RFID reader and the RFID tag 1111.

The results of processing the measured position parameters may be raw or preprocessed location parameters, such as, distances, latitudes, longitudes, altitudes, coordinates (e.g., Cartesian or Polar), a vector, or offsets from one or more known positions or references. The raw location parameters may be used to generate mapped position information, such as, actual locations in rooms, warehouses, hallways, shelves, aisles, streets, or graphic images thereof. The mapped position information may be presented to a user to allow the user to locate items to which the RFID tags are attached, for example.

In this example, the measured position parameters may be transmitted from each RFID reader 1102a-c to a server or POS device 1104 over a communication channel 1112. The communication channel 1112 may be a wired or wireless channel. For example, the communication channel 1112 may be a wired local area network connection, such as Ethernet, or it may be a wireless channel such as Bluetooth, Zigbee, Wi-Fi (IEEE 802.11 network), cellular (e.g., CDMA, TDMA, GSM), or any other wireless network, for example.

The measured position parameters from the RFID readers 1102a-c may be stored on the POS device 1104. The location module 1106 may utilize the measured position parameters to determine the location of the RFID tag 1111. The POS device 1104 and the location module 1106 may be implemented in a plurality of ways. For example, the POS device 1104 may be implemented as stand alone hardware including location module 1106 coupled to the RFID readers 1102a-c over a local wired or wireless network. Alternatively, the location module 1106 may be included as a software component on one or more RFID readers 1102a-c, and the RFID readers 1102a-c may transmit measured position parameters to one of the RFID readers 1102a-c for determining the position of the RFID tag 1111. In another embodiment of the invention, the POS device 1104 and the location module 1106 may be implemented on a remote computer system coupled to the RFID readers 1102a-c over a wide area network, such as the Internet.

In accordance with an embodiment of the invention, the RFID readers 1102a-c may transmit RF signals at the same time but with different modulated frequencies. For example, RFID readers 1102a-c may transmit at frequencies $f_A$, $f_B$, and $f_C$, respectively. By using different frequencies, it may be possible for the readers to transmit at the same time and to then recognize the backscattered signal that matches their own frequency. For example, RFID reader 1102a may use the time of arrival of the backscattered signal with frequency $f_A$ to represent the range from RFID reader 1102A to RFID tag 1111 and back to RFID reader 1102a. Similarly, RFID reader 1102b may use the time of arrival of the backscattered signal with frequency $f_B$ to represent the range from RFID reader 1102b to RFID tag 1111 and back to RFID reader 1102b. Likewise, RFID reader 1102c may use the time of arrival of the backscattered signal with frequency $f_C$ to represent the range from RFID reader 1102c to RFID tag 1111 and back to RFID reader 1102c. These times of arrival measurements along with the RFID readers' position information may then be transmitted to one of the RFID readers 1102a-c or POS device 1104 for calculating the RFID tag 1111 position using triangulation and/or geometric methods.

In accordance with an embodiment of the invention, the RFID readers 1102a-c may repeat their RF signal transmissions at frequent time intervals, for example, as instructed by the POS device 1104 or via synchronized clocks, thereby providing measured RFID tag position parameters at different time instances. The measured position parameters at each time instance may result in a plurality of corresponding raw location parameters and mapped positions. If the RFID tag 1111 is stationary, the location presented to a user may not change with time. However, if the RFID tag 1111 is moving, the location presented to a user may update at each time interval. In one embodiment of the invention, the changing information may be used to determine the rate of movement and direction of movement of a RFID tag 1111. For example, one mode of display to the user may include displaying the current position of the RFID tag 1111 as well as the velocity magnitude or speed or rate of movement and direction of movement of the RFID tag 1111. The velocity may be obtained from the current and previous time interval locations. The magnitude of the velocity may be obtained from the distance between current and previous time interval positions divided by the elapsed time interval, for example. The direction of the velocity may be obtained from the direction of the vector from the previous time interval position to the current position. In one embodiment of the invention, the location information may be stored so that the movement of RFID tags over time may be analyzed. For example, the POS device 1104 or the RFID readers 1102a-c may store in memory, the current and previous positions of the interrogated RFID tags. In one embodiment of the invention, a user may view the route traveled by the RFID tag over several previous time intervals to research movement patterns of items with attached RFID tags or track the paths traveled by lost or stolen items with attached RFID tags, for example.

In accordance with an embodiment of the invention, the location coordinates of the mobile device 1110a comprising a RFID tag 1111 may be determined based on extracting at least one measured position parameter from each of three or more backscattered signals 1108a-c communicated by the mobile device 1110a. The three or more backscattered signals 1108a-c may be received at one or more RFID readers 1102a-c located at three or more different locations in response to communicating by the one or more RFID readers 1102a-c, three or more RF signals to the mobile device 1110a.

U.S. application Ser. No. 11/641,624 filed Dec. 18, 2006, now issued as U.S. Pat. No. 8,294,554, provides a detailed description of determining the location of a RFID tag, and is hereby incorporated herein by reference in its entirety.

Figure 12:
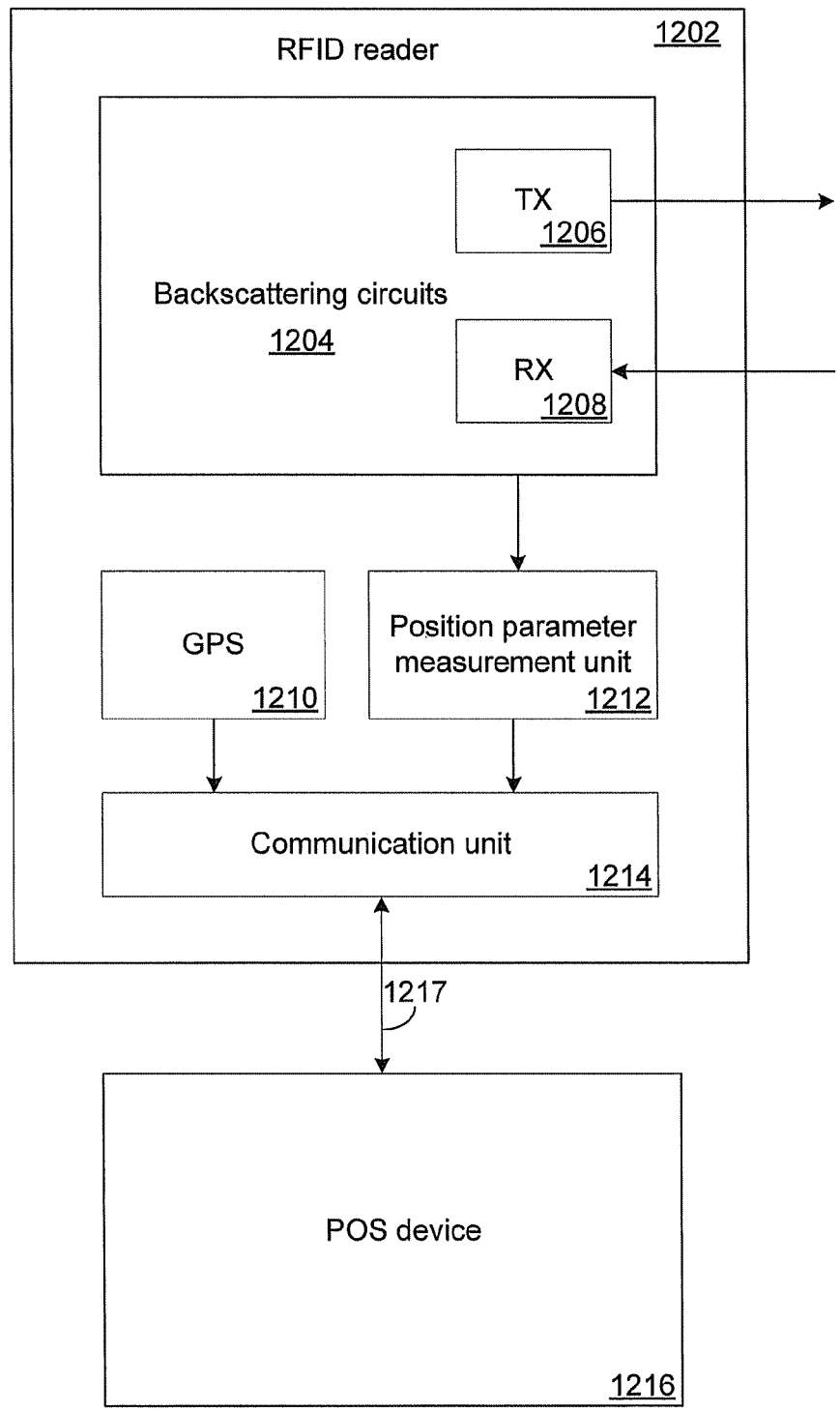
FIG. 12 is an exemplary block diagram of a RFID reader, in accordance with an embodiment of the invention.

FIG. 12 is an exemplary block diagram of a RFID reader, in accordance with an embodiment of the invention. Referring to FIG. 12, there is shown a RFID reader 1202 and a POS device 1216.

The RFID reader 1202 may comprise backscattering circuits 1204, a GPS 1210, a position parameter measurement unit 1212, and a communication unit 1214 for communicating information with the POS device 1216 over a communication channel 1217.

The backscattering circuits 1204 may comprise an RFID transmitter 1206 (TX) for generating RF signals, for example, through one or more antennas (not shown) and an RFID receiver 1208 (RX) for receiving backscattered signals from an RFID tag 1111, for example, through one or more antennas (not shown). The position parameters in the backscattered signals may be extracted using position parameter measurement unit 1212. The position parameter measurement unit 1212 may be integrated with the backscattering circuits 1204 and may comprise suitable logic, circuitry, interfaces, and/or code that may be operable to extract power from received signals, determine time of arrival, angle of arrival, or phase, for example.

The GPS 1210 may be operable to determine the location of the RFID reader 1202. In other embodiments of the invention, the RFID reader 1202 may be located in a fixed position, and its location coordinates may be stored on the RFID reader 1202. The POS device 1216 may be operable to access each RFID reader's location by issuing a reader location request, which causes each RFID reader 1202 to transmit its location to the POS device 1216. Alternatively, each RFID reader's location may be stored on the POS device 1216 or on another system accessible by the POS device 1216. The RFID reader 1202 may communicate its location coordinates via the GPS 1210 and the measured position parameters may be communicated from the position parameter measurement unit 1212 to the communication unit 1214. The communication unit 1214 may coordinate communications over the communication channel 1217 with the POS device 1216. The communication channel 1217 may be either a wired or wireless channel, and the communication unit 1214 may implement any of a variety of communication protocols for communicating over communication channel 1217. The location of the RFID tag 1111 may be determined by location software on the RFID reader 1202, for example.

Figure 13:
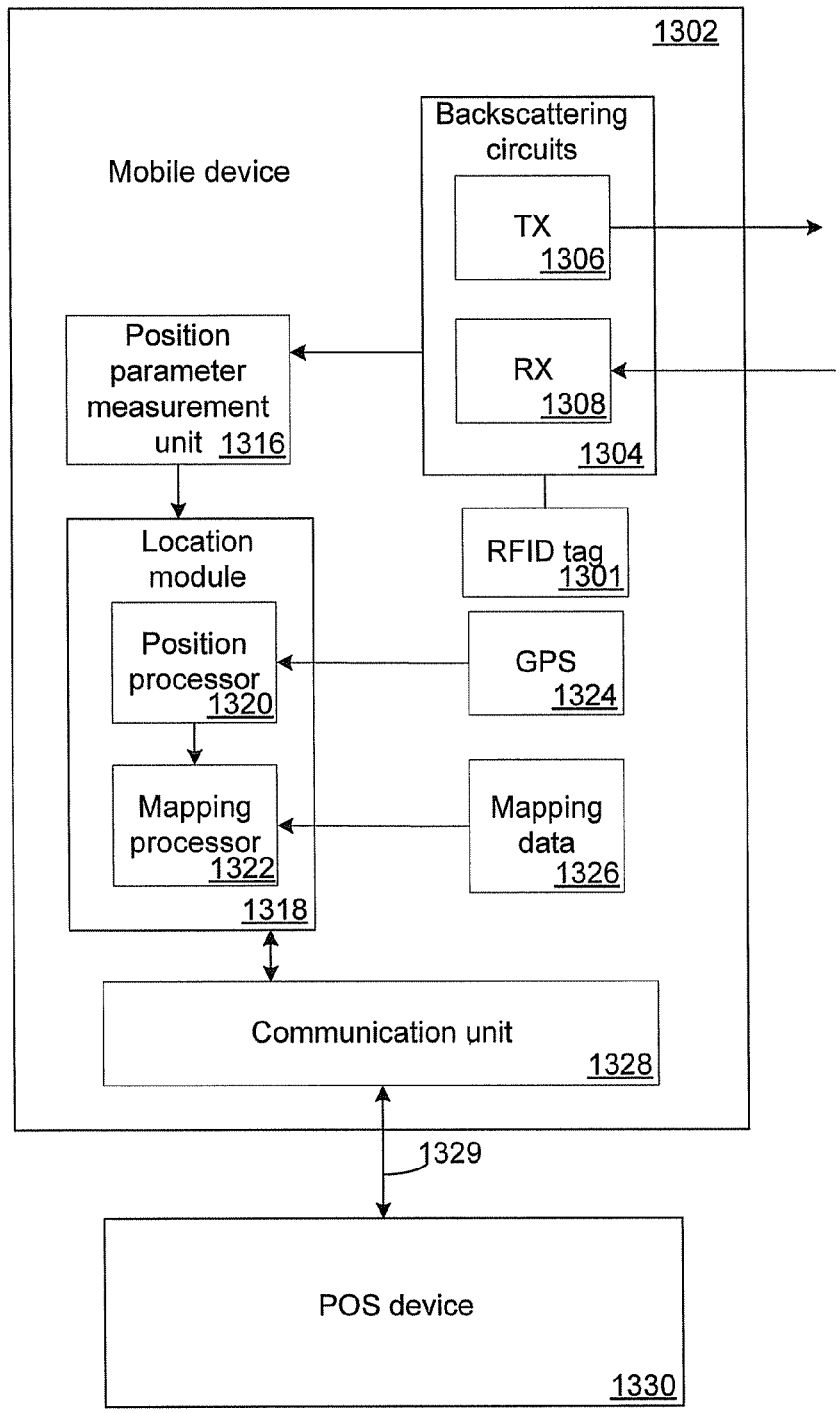
FIG. 13 is an exemplary block diagram of a mobile device with a RFID tag, in accordance with an embodiment of the invention.

FIG. 13 is an exemplary block diagram of a mobile device with a RFID tag, in accordance with an embodiment of the invention. Referring to FIG. 13, there is shown a mobile device 1302 and a POS device 1330.

The mobile device 1302 may comprise a RFID tag 1301, backscattering circuits 1304, a GPS 1324, a position parameter measurement unit 1316, a location module 1318, mapping data 1326, and a communication unit 1328 for communicating information with the POS device 1330 over a communication channel 1329.

The backscattering circuits 1304 may comprise an RFID transmitter 1306 (TX) for transmitting backscattered signals, for example, through one or more antennas (not shown) and an RFID receiver 1308 (RX) for receiving RF signals from a RFID reader 1202, for example, through one or more antennas (not shown).

The position parameters in the backscattered signals may be extracted using position parameter measurement unit 1212. The position parameter measurement unit 1212 may be integrated with the backscattering circuits 1204 and may comprise suitable logic, circuitry, interfaces, and/or code that may be operable to extract power from received signals, determine time of arrival, angle of arrival, or phase, for example.

In one embodiment of the invention, a user may send and receive three or more backscattered signals from three or more different locations and determine the location of RFID tags independently. In another embodiment of the invention, the mobile device 1302 may receive other location information from other RFID readers to determine the location of the RFID tags. For example, the mobile device 1302 may be coupled to a POS device 1330. The POS device 1330 may be coupled to other RFID readers in different locations, and the RFID readers may each send measured position parameters to the POS device 1330. The mobile device 1302 may download the measured position parameters from other RFID readers and the positions of the other RFID readers as stored on the RFID readers or on the POS device 1330.

The location module 1318 may receive the measured position parameters and positions of the systems where the position parameters were measured. The location module 1318 may be coupled to a GPS 1324 for determining the position of the mobile device 1302. The location module 1318 may comprise a position processor 1320 that may be operable to determine the raw location parameters that provide the position of the RFID tag 1301. For example, the raw location parameters may represent the position of the RFID tag 1301 as longitude, latitude, altitude, in Cartesian coordinates, polar coordinates, such as, distances and angles, or as vectors, for example.

The location module 1318 may comprise a mapping processor 1322 that may be operable to receive the raw location parameters and mapping data, and transform the raw location parameters into mapping position information. The mapping data 1326 may be used to transform the RFID tag's position from Cartesian coordinates or vector representations, for example, into mapped position information, such as, shelf locations, aisles, rooms, warehouses, hallways, or streets. The mapping software components may receive mapping data that maps raw position parameters into mapped position information. The mapping data 1326 may further comprise images or maps that may be displayed to a user with the RFID tag superimposed on the image. The mapping data 1326 may comprise information for translating raw location parameters into mapped position information, images, or information for translating between RFID tag IDs and the names of items to which the RFID tags are attached. In other embodiments of the invention, some or all of this information may be received from an external source system such as the POS device 1330, for example. In other embodiments of the invention, mapping data may be stored on the RFID tag 1301 itself. The mapping data 1326 may further comprise navigation information for providing directions to the user based on the user's current location and the location of a RFID tag.

Figure 14:
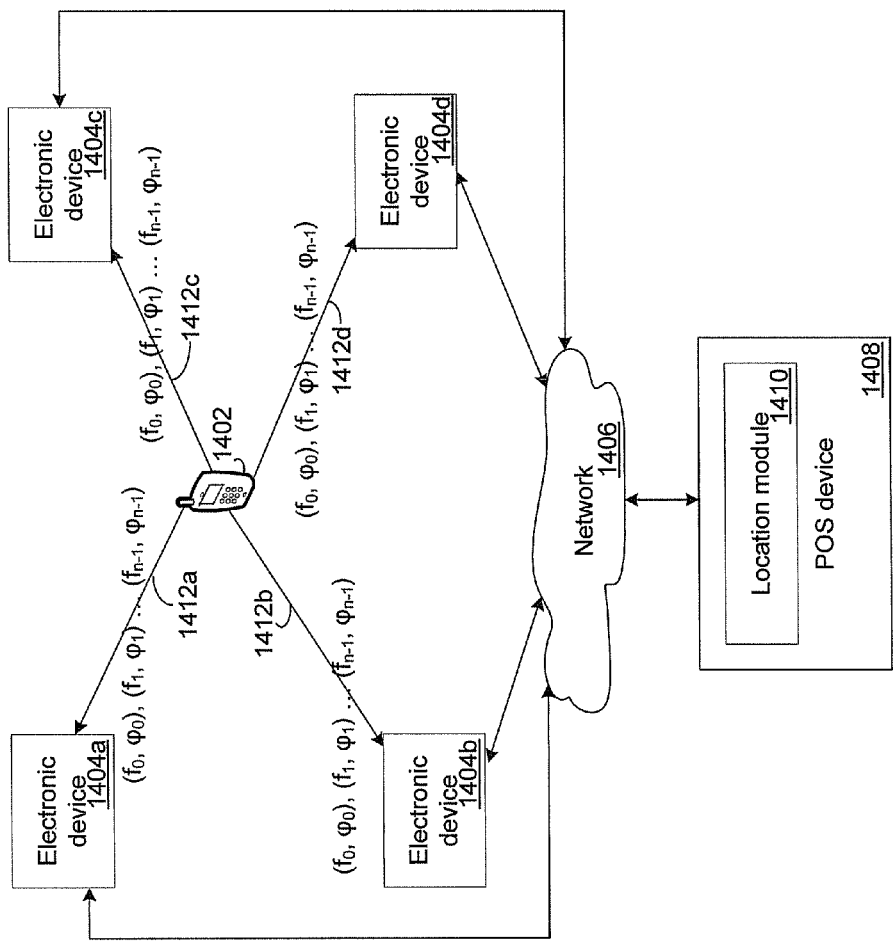
FIG. 14 is an exemplary block diagram illustrating determination of a location of a mobile device based on measured phase differences and corresponding frequency differences, in accordance with an embodiment of the invention.

FIG. 14 is an exemplary block diagram illustrating determination of a location of a mobile device based on measured phase differences and corresponding frequency differences, in accordance with an embodiment of the invention. Referring to FIG. 14, there is shown a mobile device 1402, a plurality of electronic devices 1404a-d, a network 1406, and a POS device 1408.

The plurality of electronic devices 1404a-d may be located at known locations while the location coordinates of the mobile device 1402 may be unknown. The mobile device 1402 may be operable to transmit signals and the plurality of electronic devices 1404a-d may be operable to receive signals and communicate the received signals to the POS device 1408 via the network 1406 for determining the distance between the mobile device 1402 at a unknown location and each of the plurality of electronic devices 1404a-d at known locations. The network 1406 may be a wired or a wireless network.

The mobile device 1402 may be operable to transmit signals 1412a-d with a plurality of frequencies or tones, for example, $(f_0, \phi_0), (f_1, \phi_1) \ldots (f_{n-1}, \phi_{n-1})$. The plurality of signals 1412a-d may comprise same frequencies, different frequencies, or a combination thereof. In accordance with an embodiment of the invention, the plurality of signals 1412a-d may be OFDM signals.

The plurality of electronic devices 1404a-d may be operable to receive the plurality of signals 1412a-d with a detectable phase change. In accordance with an embodiment of the invention, the received signals may be converted from analog to digital signals and be processed using digital signal processing. In another embodiment of the invention, the phase of the received frequency components, the frequency characteristics of the transmission channel, and the POS device 1408 may determine the phase differences.

The location module 1410 in the POS device 1408 may be operable to determine the distances between the plurality of electronic devices 1404a-d and the mobile device 1402 based on identifying a point on a plurality of circles (or spheres) of radius $r_i$, where $r_i$ is the distance from any of the electronic devices 1404a-d at known locations to the mobile device 1402 at the unknown location, where all four circles (or spheres) intersect. The 2D locating problem may require a minimum of three circles intersecting at one point in 2D. The 3D locating problem may require a minimum of four spheres intersecting at one point in 3D.

The location module 1410 may be operable to receive either the raw data for the digitized signals or preprocessed data, such as, measured phase differences and corresponding frequency differences associated with each of three or more signals received from the mobile device 1402 to determine the location coordinates of the mobile device 1402.

U.S. application Ser. No. 12/843,868 filed Jul. 6, 2010, now issued as U.S. Pat. No. 8,421,676, provides a detailed description of determination of a location of a mobile device based on measured phase differences and corresponding frequency differences, and is hereby incorporated herein by reference in its entirety.

Figure 15:
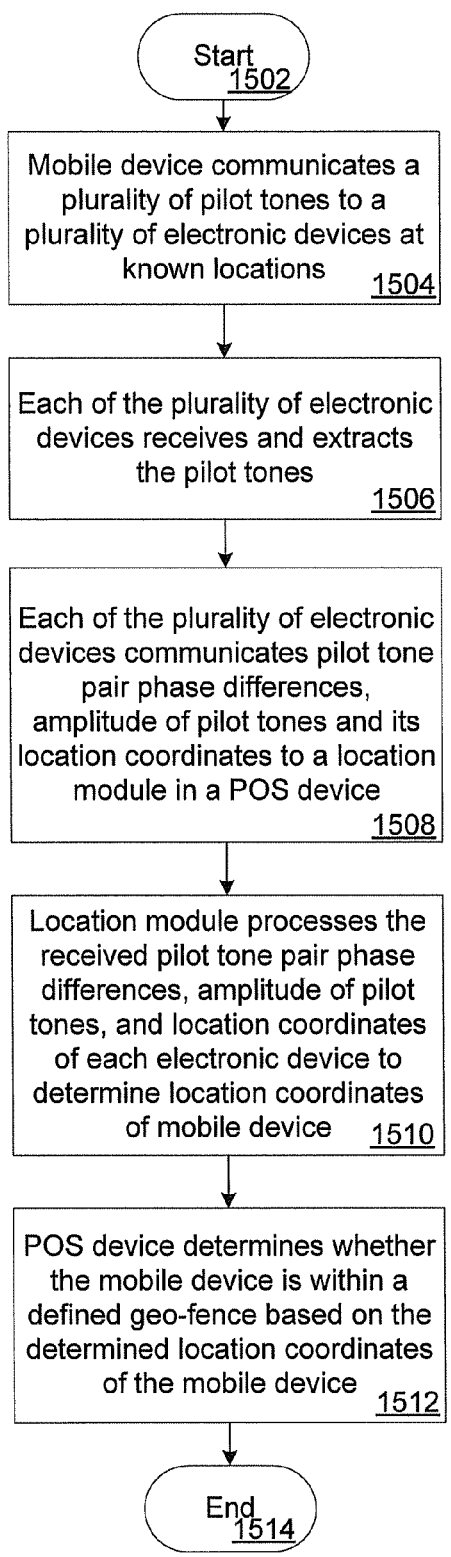
FIG. 15 is an exemplary flow chart illustrating exemplary steps for determination of a location of a mobile device based on measured phase differences and corresponding frequency differences, in accordance with an embodiment of the invention.

FIG. 15 is an exemplary flow chart illustrating exemplary steps for determination of a location of a mobile device based on measured phase differences and corresponding frequency differences, in accordance with an embodiment of the invention. Referring to FIG. 15, exemplary steps may begin at step 1502.

In step 1504, the mobile device 1402 may be operable to transmit a plurality of pilot tones to a plurality of electronic devices 1404a-d at known locations. In step 1506, each of the plurality of electronic devices 1404a-d may receive and extract the pilot tones. In step 1508, each of the plurality of electronic devices 1404a-d may communicate pilot tone pair phase differences, amplitude of pilot tones, and their location coordinates to the location module 1410 in the POS device 1408. In step 1510, the location module 1410 may process the received pilot tone pair phase differences, amplitude of pilot tones, and location coordinates of the plurality of electronic devices 1404a-d to determine the location coordinates of the mobile device 1402. In step 1512, the POS device 1408 may determine whether the mobile device 1402 is within a defined geo-fence around the POS device 1408 based on the determined location coordinates of the mobile device 1402. Control then passes to end step 1514.

Figure 16A:
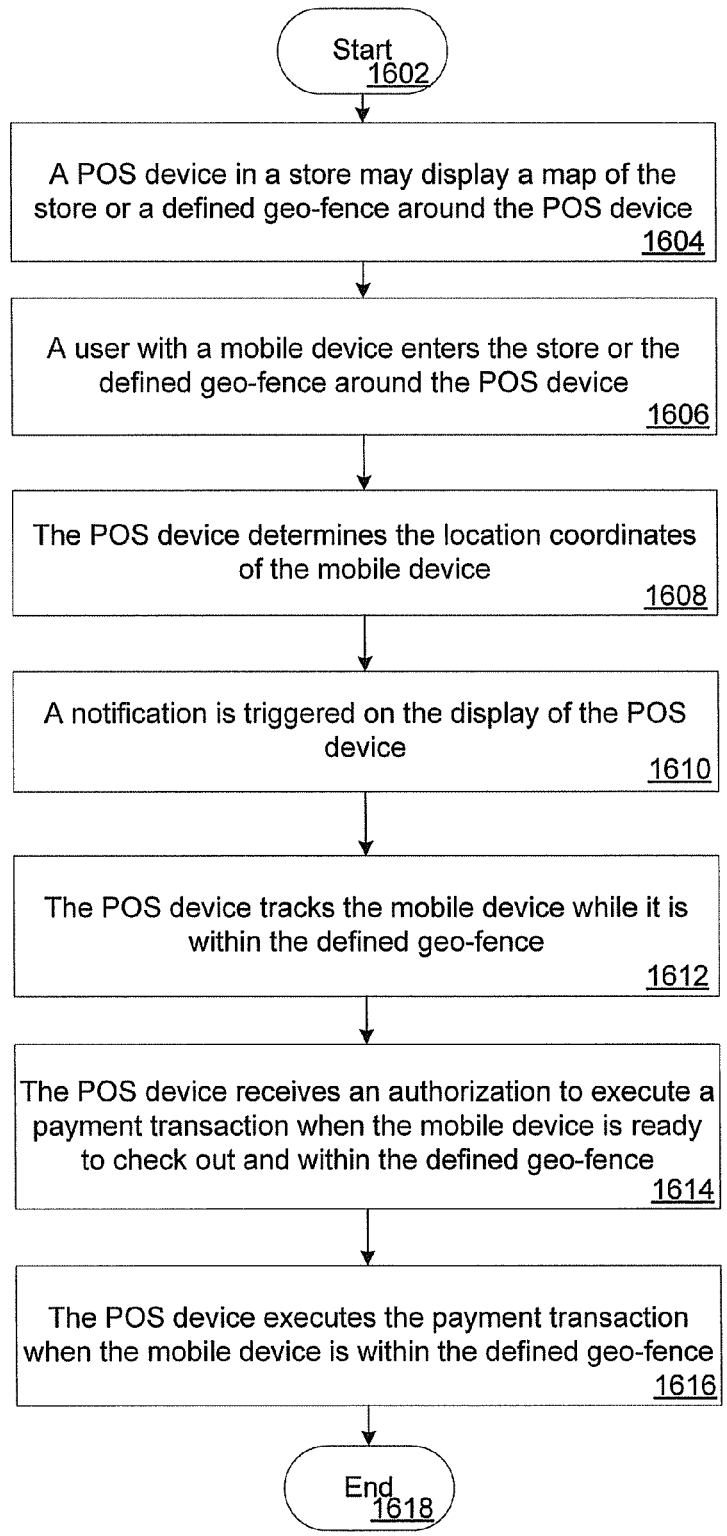
FIG. 16A is an exemplary flow chart illustrating exemplary steps for determination of a location of a mobile device by a POS device, in accordance with an embodiment of the invention.

FIG. 16A is an exemplary flow chart illustrating exemplary steps for determination of a location of a mobile device by a POS device, in accordance with an embodiment of the invention. Referring to FIG. 16A, exemplary steps may begin at step 1602.

In step 1604, a POS device 152 in a store may display a map 302 of the store or a defined geo-fence 112 around the POS device 152. In step 1606, a user of a mobile device 106 may enter the store or the defined geo-fence 112 around the POS device 152. In step 1608, the POS device 152 may be operable to determine the location coordinates of the mobile device 106 based on one or more positioning methods as detailed with respect to FIGS. 4-15. In step 1610, in instances where the mobile device 106 is within the defined geo-fence 112 of the POS device 152, a notification may be triggered on the POS device 152 indicating the presence of the mobile device 106 within a defined proximity of the POS device 152. In step 1612, the POS device 152 may track the mobile device 106 while it is within the defined go-fence 112. The user with the mobile device 106 may choose to purchase one or more items within the store or the defined geo-fence 112.

When the mobile device 106 is ready to checkout, the POS device 152 may trigger an authorization request to execute a payment transaction based on the one or more items chosen to be purchased when the mobile device 106 is within the defined geo-fence 112. In step 1614, the POS device 152 may receive an authorization response from the mobile device 106 to execute the payment transaction when the mobile device 106 is within the defined geo-fence 112. In step 1616, the POS device 152 may execute the payment transaction when the mobile device 106 is within the defined geo-fence 112. In accordance with an embodiment of the invention, the user with the mobile device 106 may be able to execute the payment transaction without physically using or swiping a credit or debit card, or without physically tapping or holding the mobile device near the POS device 152. Control then passes to end step 1618.

Figure 16B:
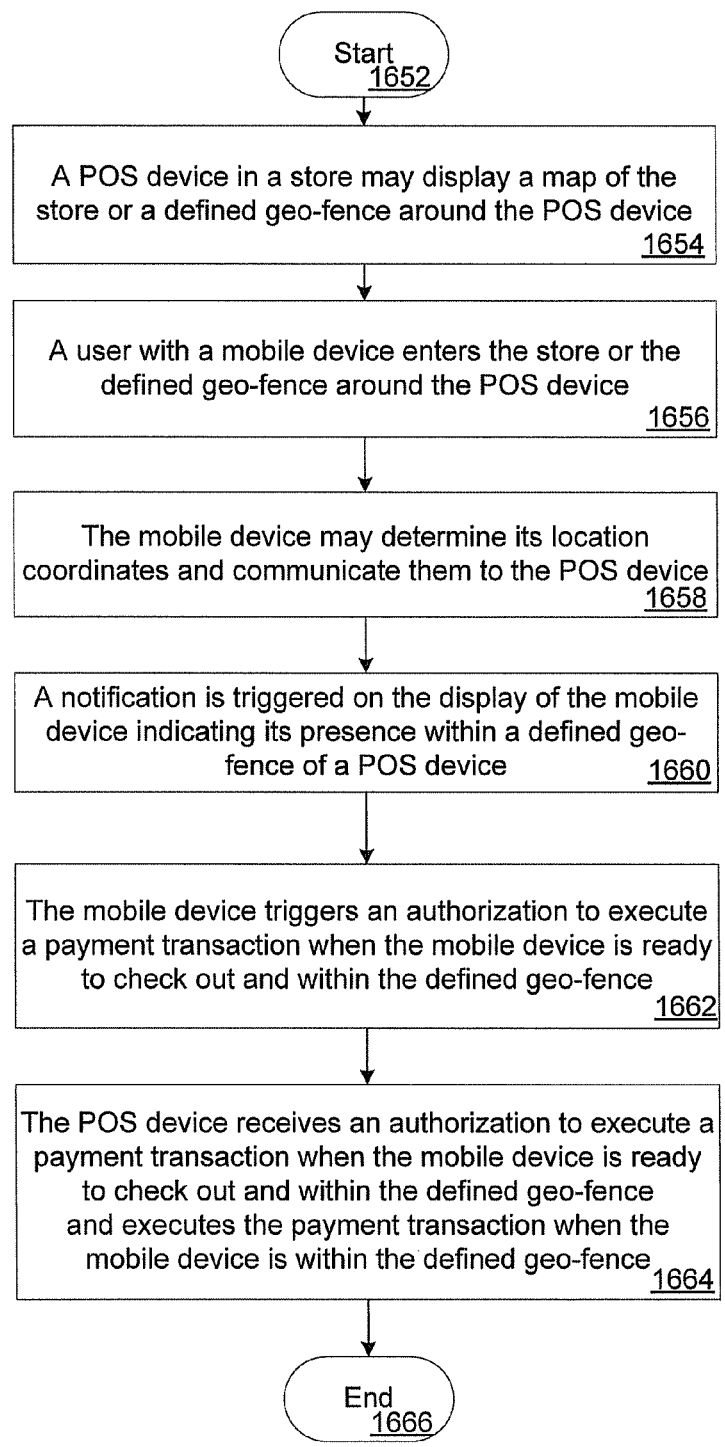
FIG. 16B is an exemplary flow chart illustrating exemplary steps for determination of a location of a mobile device, in accordance with an embodiment of the invention.

FIG. 16B is an exemplary flow chart illustrating exemplary steps for determination of a location of a mobile device, in accordance with an embodiment of the invention. Referring to FIG. 16B, exemplary steps may begin at step 1652.

In step 1654, a POS device 152 in a store may display a map 302 of the store or a defined geo-fence 112 around the POS device 152. In step 1656, a user of a mobile device 106 may enter the store or the defined geo-fence 112 around the POS device 152. In step 1658, the mobile device 106 may be operable to determine the location coordinates of the mobile device 106 based on one or more positioning methods as detailed with respect to FIGS. 4-15 and communicate the determined location coordinates to the POS device 152. In step 1660, in instances where the mobile device 106 is within the defined geo-fence 112 of the POS device 152, a notification may be triggered on the mobile device 106 indicating its presence within a defined proximity of the POS device 152. The user with the mobile device 106 may choose to purchase one or more items within the store or the defined geo-fence 112. When the mobile device 106 is ready to checkout, the POS device 152 may trigger an authorization request to execute a payment transaction based on the one or more items chosen to be purchased when the mobile device 106 is within the defined geo-fence 112. In step 1662, the mobile device 106 may trigger an authorization response to the POS device 152 to execute the payment transaction when it is within the defined geo-fence 112. In step 1664, the POS device 152 may receive an authorization response from the mobile device 106 to execute the payment transaction when the mobile device 106 is within the defined geo-fence 112 and the POS device 152 may execute the payment transaction when the mobile device 106 is within the defined geo-fence 112. In an alternative embodiment, a user of the mobile device 106 may give the authorization, for example, the user may say "Put it on my account" which may be video recorded to later resolve any potential disputes of a transaction. Control then passes to end step 1666.

In accordance with an embodiment of the invention, a method and system for location based hands-free payment may comprise a network 150 (FIG. 1B) comprising a plurality of mobile devices 104 (FIG. 1B), 106 (FIG. 1B), 108 (FIG. 1B), 110 (FIG. 1B), and a plurality of point of sale devices 152 (FIG. 1B). A first of the plurality of mobile devices, for example, the mobile device 106 may be operable to determine its location coordinates based on one or more positioning methods as detailed with respect to FIGS. 4-15 and communicate the determined location coordinates to a selected one of the plurality of POS devices, for example, the POS device 152. The mobile device 106 may trigger an authorization to execute a payment transaction when the mobile device 106 is within a defined proximity of the POS device 152. The mobile device 106 may determine whether it is within the defined proximity of the POS device 152 based on a generated geofence 112 (FIG. 1) around the POS device 152.

A mobile device 106, whose location coordinates need to be determined, may be operable to retrieve a first set of parameters from a reference database 430 (FIG. 4) corresponding to a plurality of signals received at the location coordinates of the mobile device 106. The plurality of signals may be received from a plurality of signal sources, such as, a plurality of satellites $434_1 \ldots 434_4$ (FIG. 4), a plurality of access points $436_1 \ldots 436_4$ (FIG. 4), and/or a cell tower 438 (FIG. 4). The received plurality of signals may comprise at least one multipath signal. The reference database 430 may store channel parameters corresponding to the plurality of signals received at each of a plurality of location coordinates of the plurality of mobile devices 104, 108, and 110 in the network 150 with known location coordinates. The mobile device 106 may determine its location coordinates based on comparing the retrieved first set of parameters with the stored parameters in the reference database 430. The retrieved first set of parameters and the stored parameters in the reference database 430 may comprise one or more of a time of arrival (TOA) delay extracted using received signal strength indicator (RSSI) transition, a time of arrival delay extracted using signal preamble correlation, a time difference of arrival (TDOA), a transmitted signal strength, an angle of arrival (AOA), equalizer filter coefficients, channel multipath profile, channel fast Fourier transform (FFT) coefficients, beacon signal strength, phase of each pilot tone, amplitude of each pilot tone and/or Doppler shift associated with movement of the plurality of mobile devices, for example, mobile devices 104, 108, and 110. The received plurality of signals may correspond to one or more standards comprising one or more of WLAN, Bluetooth, WiMax, HD Radio, UWB, GPS, cellular, and/or 60 GHz standards.

In accordance with an embodiment of the invention, the location coordinates of the mobile device 702 (FIG. 7) may be determined based on receiving GPS information from a plurality of GPS satellites 718 (FIG. 7) and a weighted average of a plurality of differential correction and/or assistance data from one or more access points 720 (FIG. 7). The weight assigned to each of the plurality of differential correction and/or assistance data may be determined based on one or more of a reception characteristic of each of the one or more access points 720, a relative distance, a relative received power level and/or a relative received phase difference between the mobile device 702 and each of the one or more access points 720. The plurality of differential correction and/or assistance data received from the one or more access points 720 may correspond to one or more standards comprising one or more of WLAN, Bluetooth, WiMax, HD Radio, UWB, GPS, cellular, NFC, and/or 60 GHz standards.

In accordance with an embodiment of the invention, the location coordinates of the mobile device 602 (FIG. 6) may be determined based on a calculated time of travel of a received signal from one or more access points 604 (FIG. 6) to the mobile device 602. The time of travel of the received signal may be calculated based on correlating the received signal with a corresponding received signal with a similar known radio transmission pattern. For example, the time of travel of the received signal may be calculated based on correlating a preamble of the received signal, for example, signal received at short preamble correlator 628 (FIG. 6) or long preamble correlator 630 (FIG. 6) with a preamble of the corresponding received signal with the similar known radio transmission pattern, for example, signal output by the known short preamble correlator 626 (FIG. 6) or known long preamble correlator 632 (FIG. 6) respectively.

In accordance with an embodiment of the invention, the determined location coordinates of the mobile device 902 (FIG. 9) may be recalibrated based on receiving a plurality of positioning assistance data from one or more position reference devices, for example, a POS device 904 (FIG. 9) via passive and active NFC tags, a mobile device 906 (FIG. 9) via Bluetooth, a mobile device 908 (FIG. 9) via Wi-Fi Direct, a plurality of access points AP1 910 (FIG. 9) and AP2 914 (FIG. 9) via WLAN, a 60 GHz position reference communicator 912 (FIG. 9) via 60 GHz standard or other high frequency narrow beam methods, a plurality of cellular towers 916 (FIG. 9) and 918 (FIG. 9) via cellular standards, and/or a passive or active RFID position reference tag 920 (FIG. 9) using short range wireless communication protocols.

In accordance with another embodiment of the invention, a method and system for location based hands-free payment may comprise a network 150 (FIG. 1B) comprising a plurality of mobile devices 104 (FIG. 1B), 106 (FIG. 1B), 108 (FIG. 1B), 110 (FIG. 1B), and a plurality of point of sale devices 152 (FIG. 1B). A first of the plurality of POS devices, for example, the POS device 152 may be operable to determine the location coordinates of a selected one of the plurality of mobile devices, for example, mobile device 106 based on one or more positioning methods as detailed with respect to FIGS. 4-15. The POS device 152 may trigger a notification when the mobile device 106 is within a defined proximity of the POS device 152. The POS device 152 may generate a geo-fence 112 (FIG. 1B) around it to determine whether the mobile device 106 is within the defined proximity of the POS device 152. The POS device 152 may receive an authorization to execute a payment transaction when the mobile device 106 is within a defined proximity of the POS device 152. The POS device 152 may receive a speed of movement and a direction of movement of the mobile device 106.

In accordance with an embodiment of the invention, the POS device 1104 (FIG. 11) may determine the location coordinates of the mobile device 1110a (FIG. 11) comprising a RFID tag 1111 (FIG. 11) based on extracting at least one measured position parameter from each of three or more backscattered signals 1108a-c (FIG. 11) communicated by the mobile device 1110a. The three or more backscattered signals 1108a-c may be received at one or more RFID readers 1102a-c (FIG. 11) located at three or more different locations in response to communicating by the one or more RFID readers 1102a-c, three or more RF signals to the mobile device 1110a. The RFID readers 1102a-c may be operable to communicate the backscattered signals to the POS device 1104 via a network 1112 (FIG. 11).

In accordance with an embodiment of the invention, the POS device 1408 (FIG. 14) may determine the location coordinates of the mobile device 1402 (FIG. 14) based on the measured phase differences and corresponding frequency differences associated with each of three or more signals received from the mobile device 1402. Each of the three or more signals may comprise a plurality of pilot tones, for example, $(f_0, \phi_0), (f_1, \phi_1) \ldots (f_{n-1}, \phi_{n-1})$ that may be received at one or more electronic devices 1404a-d (FIG. 14) located at three or more different known locations via the network 1406 (FIG. 14). Each of the three or more signals may be OFDM signals that may be received at one or more electronic devices 1404a-d located at three or more different known locations via the network 1406. The POS device 1408 may be operable to determine the location coordinates of the mobile device 1402 based on received pilot tone pair phase differences, amplitude of pilot tones, and coordinates of one or more electronic devices 1404a-d located at three or more different known locations.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps comprising a network that comprises a plurality of mobile devices and a plurality of point of sale devices. A first mobile device may determine its location coordinates and communicate them to a selected point of sale device. An authorization to execute a payment transaction may be triggered on the first mobile device when it is within a defined proximity of the selected point of sale device. In another embodiment of the invention, a first point of sale device may determine the location coordinates of a selected mobile device and trigger a notification based on a generated geo-fence when the selected mobile device is within a defined proximity of the first point of sale device.

Accordingly, the present invention may be realized in hardware, or a combination of hardware and software. The present invention may be realized in a centralized fashion in at least one computer system, or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for performing point of sale transactions in a network comprising a plurality of mobile devices and a plurality of point of sale devices, the method comprising:
   at a first mobile device of the plurality of the mobile devices, determining location coordinates of the first mobile device;
   sending said determined location coordinates from the first mobile device to a first point of sale device of said plurality of point of sale devices, wherein a geo-fence is defined around the first point of sale device;
   receiving an authorization request at the first mobile device from the first point of sale device to execute a payment transaction when the first mobile device is within the geo-fence defined around the first point of sale device; and
   sending a verbal authorization from a user of the first mobile device for executing the payment transaction to the first point of sale device when the first mobile device is within said geo-fence defined around the first point of sale device, the verbal authorization for video recording at the first point of sale device to resolve potential disputes of the payment transaction.

2. The method of claim 1 further comprising determining whether the first mobile device is within a defined proximity of the first point of sale device based on said geo-fence defined around the first point of sale device.

3. The method of claim 1 further comprising retrieving a first set of parameters from a reference database corresponding to a plurality of signals received at said location coordinates of the first mobile device, wherein said plurality of signals are received from a plurality of signal sources, and said plurality of signals comprises at least one multipath signal.

4. The method of claim 3, wherein said reference database stores parameters corresponding to said plurality of signals received at each of a plurality of location coordinates of said plurality of mobile devices in said network with known location coordinates.

5. The method of claim 4 further comprising determining said location coordinates of the first mobile device based on comparing said retrieved first set of parameters with said stored parameters in said reference database.

6. The method of claim 5, wherein said retrieved first set of parameters and said stored parameters comprise at least one of a time of arrival delay extracted using received signal strength indicator (RSSI) transition, a time of arrival delay extracted using signal preamble correlation, a time difference of arrival, a transmitted signal strength, an angle of arrival, equalizer filter coefficients, a channel multipath profile, channel fast Fourier transform (FFT) coefficients, a beacon signal strength, phase of each pilot tone, amplitude of each pilot tone and Doppler shift associated with movement of said plurality of mobile devices.

7. The method of claim 5 further comprising receiving said plurality of signals corresponding to at least one of Wireless Local Area Network (WLAN) standard, Bluetooth standard, WiMax standard, HD Radio standard, Ultra-wideband (UWB) standard, Global Positioning System (GPS) standard, cellular standard, and 60 GHz standard.

8. The method of claim 1 further comprising determining said location coordinates of the first mobile device based on receiving global positioning system (GPS) information from a plurality of GPS satellites and a weighted average of at least one of (i) a plurality of differential correction data and (ii) a plurality of assistance data from one or more access points.

9. The method of claim 1 further comprising determining said location coordinates of the first mobile device based on a calculated time of travel of a received signal from one or more access points to the first mobile device.

10. The method of claim 1 further comprising recalibrating said determined location coordinates of the first mobile device based on receiving a plurality of positioning assistance data from one or more position reference devices using short range wireless communication protocols.

11. The method of claim 10, wherein said one or more position reference devices comprises at least one of passive near field communication (NFC) tags, active NFC tags, passive radio frequency identification (RFID) tags, active RFID tags, Bluetooth enabled devices, Wi-Fi Direct, 60 GHz enabled devices, and Wireless Local Area Network (WLAN) access points.

12. The method of claim 1 further comprising:
prior to receiving said authorization request, sending a payment transaction order from the first mobile device to the first point of sale device when the first mobile device is within the defined geo-fence of the point of sale device.

13. A method for performing point of sale transactions in a network comprising a plurality of mobile devices and a plurality of point of sale devices, the method comprising:
determining at a first of said plurality of point of sale devices, location coordinates of a first mobile device of said plurality of mobile devices, wherein a geo-fence is defined around the first point of sale device; and
triggering a notification on the first point of sale device when the first mobile device is within the geo-fence defined around the first point of sale device;
sending an authorization request to the first mobile device from the first point of sale device to execute a payment transaction when the first mobile device is within the geo-fence defined around the first point of sale device;
receiving a verbal authorization from a user of the first mobile device for executing the payment transaction to the first point of sale device when the first mobile device is within the geo-fence defined around the first point of sale device;
video recording the verbal authorization at the first point of sale device to resolve potential disputes of the payment transaction when the first mobile device is within the geo-fence defined around the first point of sale device; and
executing the payment transaction at the first point of sale device when the first mobile device is within the geo-fence defined around the first point of sale device.

14. The method of claim 13, wherein the first mobile device comprises a radio frequency identification (RFID) tag, the method further comprising determining said location coordinates of the first mobile device based on extracting at least one measured position parameter from each of three or more backscattered signals communicated by the RFID tag of the first mobile device.

15. The method of claim 14, wherein said three or more backscattered signals are received at one or more RFID readers located at three or more different locations in response to communicating by said one or more RFID readers, three or more RF signals to the first mobile device.

16. The method of claim 13 further comprising determining said location coordinates of the first mobile device based on measured phase differences and corresponding frequency differences associated with each of three or more signals received from the first mobile device.

17. The method of claim 16, wherein each of said three or more signals comprises a plurality of pilot tones that are received at one or more electronic devices located at three or more different known locations via said network.

18. The method of claim 16, wherein each of said three or more signals are orthogonal frequency division multiplexed (OFDM) signals that are received at one or more electronic devices located at three or more different known locations via said network.

19. The method of claim 13 further comprising determining said location coordinates of the first mobile device based on received pilot tone pair phase differences, amplitude of pilot tones, and coordinates of one or more electronic devices located at three or more different known locations.

20. The method of claim 13 further comprising receiving an authorization to execute the payment transaction when the first mobile device is within a defined proximity of said first of said plurality of point of sale devices.

21. The method of claim 13, further comprising determining whether the first mobile device is within a defined proximity of the first point of sale device based on said geo-fence defined around the first point of sale device.

22. The method of claim 13, further comprising receiving a speed of movement and a direction of movement of the first mobile device at the first point of sale device.

23. The method of claim 13 further comprising:
prior to sending said authorization request, accepting a payment transaction order from the first mobile device at the first point of sale device after determining, based on the location coordinates of the first mobile device, that the first mobile device is within the defined geo-fence of the point of sale device.

24. A system for communication, the system comprising:
a network comprising;
a plurality of mobile devices comprising a first mobile device, the first mobile device comprising at least one processor and a set of circuits; and
a plurality of point of sale devices;
wherein the first mobile device is configured to:
determine location coordinates of the first mobile device;
send said determined location coordinates from the first mobile device to a first point of sale device of said plurality of point of sale devices, wherein a geo-fence is defined around the first point of sale device;
receive an authorization request at the first mobile device from the first point of sale device to execute a payment transaction when the first mobile device is within the geo-fence defined around the first point of sale device; and
send a verbal authorization from a user of the first mobile device for executing the payment transaction to the first point of sale device when the first mobile device is within said geo-fence defined around the first point of sale device, the verbal authorization for video recording at the first point of sale device when the first mobile device is within the geo-fence defined around the first point of sale device to resolve potential disputes of the payment transaction.

25. The system of claim 24, wherein the first mobile device is further configured to determine whether the first mobile device is within a defined proximity of the first point of sale device based on said geo-fence defined around the first point of sale device.

26. The system of claim 24, wherein the first mobile device is further configured to retrieve a first set of parameters from a reference database corresponding to a plurality of signals received at said location coordinates of the first mobile device, wherein said plurality of signals are received from a plurality of signal sources, and said plurality of signals comprises at least one multipath signal.

27. The system of claim 26, wherein said reference database stores parameters corresponding to said plurality of signals received at each of a plurality of location coordinates of said plurality of mobile devices in said network with known location coordinates.

28. The system of claim 27, wherein the first mobile device is further configured to determine said location coordinates of the first mobile device based on comparing said retrieved first set of parameters with said stored parameters in said reference database.

29. The system of claim 28, wherein the first mobile device is further configured to receive said plurality of signals corresponding to at least one of Wireless Local Area Network (WLAN) standard, Bluetooth, WiMax standard, HD Radio standard, Ultra-wideband (UWB) standard, Global Positioning System (GPS) standard, cellular standard, and 60 GHz standard.

30. The system of claim 27, wherein said retrieved first set of parameters and said stored parameters comprise at least one of a time of arrival delay extracted using received signal strength indicator (RSSI) transition, a time of arrival delay extracted using signal preamble correlation, a time difference of arrival, a transmitted signal strength, an angle of arrival, equalizer filter coefficients, a channel multipath profile, channel fast Fourier transform (FFT) coefficients, beacon signal strength, phase of each pilot tone, amplitude of each pilot tone and Doppler shift associated with movement of said plurality of mobile devices.

31. The system of claim 24, wherein the first mobile device is further configured to determine said location coordinates of the first mobile device based on receiving global positioning system (GPS) information from a plurality of GPS satellites and a weighted average of at least one of (i) a plurality of differential correction data and (ii) a plurality of assistance data from one or more access points.

32. The system of claim 31, wherein a weight assigned to each of said plurality of differential correction data and said plurality of assistance data is determined based on at least one of a reception characteristic of each of said one or more access points, a relative distance, a relative received power level, and a relative received phase difference between the first mobile device and each of said one or more access points.

33. The system of claim 32, wherein said plurality of differential correction and assistance data received from said one or more access points corresponds to at least one of Wireless Local Area Network (WLAN) standard, Bluetooth standard, WiMax standard, HD Radio standard, Ultra-wideband (UWB) standard, GPS standard, cellular standard, near field communication (NFC) standard, and 60 GHz standard.

34. The system of claim 24, wherein the first mobile device is further configured to determine said location coordinates of the first mobile device based on a calculated time of travel of a received signal from one or more access points to the first mobile device.

35. The system of claim 34, wherein the first mobile device is further configured to calculate said time of travel of said received signal based on correlating said received signal with a corresponding received signal with a similar known radio transmission pattern.

36. The system of claim 34, wherein the first mobile device is further configured to calculate said time of travel of said received signal based on correlating a preamble of said received signal with a preamble of said corresponding received signal with said similar known radio transmission pattern.

37. The system of claim 24, wherein the first mobile device is further configured to recalibrate said determined location coordinates of the first mobile device based on receiving a plurality of positioning assistance data from one or more position reference devices using short range wireless communication protocols.

38. The system of claim 37, wherein said one or more position reference devices comprises at least one of passive near field communication (NFC) tags, active NFC tags, passive radio frequency identification (RFID) tags, active RFID tags, Bluetooth enabled devices, Wi-Fi Direct, 60 GHz enabled devices, and Wireless Local Area Network (WLAN) access points.

39. The system of claim 24, wherein the first mobile device is further configured to send, prior to receiving said authorization request, a payment transaction order to the first point of sale device when the first mobile device is within the defined geo-fence of the point of sale device.

40. A system for communication, the system comprising:
a network comprising
a plurality of mobile devices; and
a plurality of point of sale devices comprising a first point of sale device, the first point of sale device comprising at least one processor and a set of circuits, wherein a geo-fence is defined around the first point of sale device, wherein the first point of sale device is configured to:
determine location coordinates of a first mobile device of said plurality of mobile devices; and
trigger a notification when the first mobile device is within the geo-fence defined around the first point of sale device;
send an authorization request to the first mobile device to execute a payment transaction when the first mobile device is within the geo-fence defined around the first point of sale device;
receive a verbal authorization from a user of the first mobile device for executing the payment transaction to the first point of sale device when the first mobile device is within the geo-fence defined around the first point of sale device;
video record the verbal authorization at the first point of sale device to resolve potential disputes of the payment transaction; and
execute the payment transaction at the first point of sale device when the first mobile device is within the geo-fence defined around the first point of sale device.

41. The system of claim 40, wherein the first mobile device comprises a radio frequency identification (RFID) tag, wherein the first point of sale device is further configured to determine said location coordinates of the first mobile device based on extracting at least one measured position parameter from each of three or more backscattered signals communicated by the RFID tag of the first mobile device.

42. The system of claim 41, wherein said three or more backscattered signals are received at one or more RFID readers located at three or more different locations in response to communicating by said one or more RFID readers, three or more RF signals to the first mobile device.

43. The system of claim 40, wherein the first point of sale device is further configured to determine said location coordinates of the first mobile device based on measured phase differences and corresponding frequency differences associated with each of three or more signals received from the first mobile device.

44. The system of claim 43, wherein each of said three or more signals comprises a plurality of pilot tones that are received at one or more electronic devices located at three or more different known locations via said network.

45. The system of claim 43, wherein each of said three or more signals are orthogonal frequency division multiplexed (OFDM) signals that are received at one or more electronic devices located at three or more different known locations via said network.

46. The system of claim 40, wherein the first point of sale device is further configured to determine said location coordinates of the first mobile device based on received pilot tone pair phase differences, amplitude of pilot tones, and coordinates of one or more electronic devices located at three or more different known locations.

47. The system of claim 40, wherein the first point of sale device is further configured to receive an authorization to execute the payment transaction when the first mobile device is within a defined proximity of said first of said plurality of point of sale devices.

48. The system of claim 40, wherein the first point of sale device is further configured to determine whether the first mobile device is within a defined proximity of the first point of sale device based on said geo-fence defined around the first point of sale device.

49. The system of claim 40, wherein the first point of sale device is further configured to receive a speed of movement and a direction of movement of the first mobile device at the first point of sale device.

50. The system of claim 40, wherein the first point of sale device is further configured to accept, prior to sending said authorization request, a payment transaction order from the first mobile device after determining, based on the location coordinates of the first mobile device, that the first mobile device is within the defined geo-fence of the point of sale device.

* * * * *